US012811837B2

(12) United States Patent
Baird et al.

(10) Patent No.: US 12,811,837 B2
(45) Date of Patent: Nov. 24, 2026

(54) ADAPTIVE SERVOMECHANISM FOR PEAK-TO-AVERAGE POWER RATIO OPTIMIZATION IN FM DIGITAL RADIO TRANSMISSION

(71) Applicant: iBiquity Digital Corporation, Columbia, MD (US)

(72) Inventors: Jeffrey Baird, Columbia, MD (US); Denise Cammarata, Reisterstown, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 19/072,915

(22) Filed: Mar. 6, 2025

(65) Prior Publication Data

US 2025/0286764 A1 Sep. 11, 2025

Related U.S. Application Data

(60) Provisional application No. 63/562,261, filed on Mar. 7, 2024.

(51) Int. Cl.
*H04L 1/20* (2006.01)
*H04L 25/03* (2006.01)
(Continued)

(52) U.S. Cl.
CPC .... *H04L 27/2621* (2013.01); *H04L 25/03853* (2013.01); *H04L 27/36* (2013.01); *H04W 24/08* (2013.01)

(58) Field of Classification Search
CPC ......... H04L 1/20; H04L 25/022; H04L 1/206; H04L 25/0232; H04L 12/2801;
(Continued)

(56) References Cited

U.S. PATENT DOCUMENTS 10,341,153 B2 * 7/2019 Nakada ................ H04B 7/0434
11,451,425 B2 * 9/2022 Sridharan ......... H04L 25/03834
(Continued)

*Primary Examiner* — Eva Y Puente
(74) *Attorney, Agent, or Firm* — Lerner David LLP

(57) ABSTRACT

A PAPR optimization method for digital FM radio transmission is disclosed. The method includes generating an Orthogonal Frequency-Division Multiplexed (OFDM) signal for transmission and applying an adaptive PAPR reduction algorithm to the generated signal. The method further includes determining a Modulation Error Ratio (MER) for one or more frequency sidebands and iteratively adjusting PAPR reduction parameters based on the measured MER values. The adjustment includes optimizing the number of PAPR reduction iterations for a highest-power primary digital sideband, optimizing QAM constellation constraint limits, and adjusting convergence bias weight settings for a lowest-power primary digital sideband and/or secondary digital sidebands to maintain target MER values. The method further includes updating PAPR reduction parameters in real-time until the measured MER values meet predefined target thresholds and executing instructions to coordinate the operation of an optimization servomechanism, ensuring dynamic PAPR optimization across multiple transmission modes.

20 Claims, 17 Drawing Sheets

(51) Int. Cl.

| | |
|---|---|
| ***H04L 27/26*** | (2006.01) |
| ***H04L 27/36*** | (2006.01) |
| ***H04W 24/08*** | (2009.01) |

(58) Field of Classification Search

CPC . H04L 27/0012; H04L 25/0236; H04L 25/49; H04B 1/0475; H04B 2001/0425; H04B 17/13; H04B 1/04; H04B 2001/0408; H04B 1/0483; H04B 17/101; H04B 2001/045; H03F 3/245; H03F 1/3247; H03F 2200/451; H03F 3/24; H03F 3/19; H03F 1/3241; H03F 3/195; H03F 3/68; H03F 1/3258

See application file for complete search history.

(56) References Cited

U.S. PATENT DOCUMENTS

| | | | | |
|---|---|---|---|---|
| 11,700,161 B2 * | 7/2023 | Schmid | H04H 20/00 | 375/295 |
| 2010/0091900 A1 * | 4/2010 | Gan | H04L 27/2614 | 375/267 |
| 2015/0117558 A1 * | 4/2015 | Phillips | H04L 27/2615 | 375/261 |
| 2025/0126009 A1 * | 4/2025 | Rostami | H04L 27/2614 | |

* cited by examiner

ADAPTIVE SERVOMECHANISM FOR PEAK-TO-AVERAGE POWER RATIO OPTIMIZATION IN FM DIGITAL RADIO TRANSMISSION

CROSS-REFERENCE TO RELATED APPLICATIONS

This application is related to and claims priority to U.S. Provisional Application No. 63/562,261, filed on Mar. 7, 2024, and titled "AUTOMATED PAR PARAMETER SETTING ALGORITHM", which is hereby incorporated by reference in its entirety.

BACKGROUND

Technical Field

The present disclosure relates to the field of digital frequency modulation (FM) radio transmission, and particularly relates to managing Peak-to-Average Power Ratio (PAPR) in Orthogonal Frequency-Division Multiplexed (OFDM) signals used in digital FM broadcasting.

Description of the Related Art

With advancements in digital broadcasting, FM radio transmission has evolved from traditional analog techniques to more complex digital transmission schemes, such as OFDM-based modulation. These modern digital transmission systems offer higher spectral efficiency, improved resilience to interference, and better signal integrity over varying channel conditions. As a result, digital FM broadcasting has been widely adopted for delivering high-quality audio and data services. However, despite its advantages, OFDM-based digital FM transmission introduces significant challenges, particularly concerning Peak-to-Average Power Ratio (PAPR). The nature of OFDM signals results in high peak power levels compared to their average power levels, leading to increased nonlinear distortions in power amplifiers (PAS). This issue is further exacerbated when higher-order Quadrature Amplitude Modulation (QAM) schemes are used, which require stringent signal integrity for maintaining quality performance.

High PAPR in digital FM transmission systems presents several technical issues. One of the issues is that most power amplifiers (PAs) operate efficiently only within a limited power range, such that when the signal exhibits high peaks, the amplifier either clips the signal, introducing intermodulation distortions, or requires back-off operation, reducing power efficiency (i.e., power amplifier non-linearity). Another problem is that PAPR-induced distortions degrade the Modulation Error Ratio (MER), which is a critical performance parameter in digital radio transmission, and lower MER results in poor signal demodulation and reception quality (i.e., increased signal distortion). Yet another problem is that high PAPR leads to excessive spectral leakage, causing interference in adjacent frequency bands, which is undesirable in regulated FM broadcast environments (i.e., spectral regrowth and adjacent channel interference). Yet another problem is that transmitters must operate at a reduced average power level to accommodate peak values, leading to suboptimal power consumption and reduced transmission range (i.e., inefficient power utilization).

To mitigate these challenges, various PAPR reduction techniques have been explored, including clipping and filtering, coding techniques, and signal processing approaches. However, existing solutions either introduce significant signal distortion, increase computational complexity, or fail to adapt dynamically to varying transmission conditions. Thus, there remains a need for an improved solution that effectively reduces PAPR while maintaining signal integrity, optimizing power efficiency, and ensuring compliance with transmission standards in digital FM broadcasting, and overcomes the above-mentioned drawbacks.

BRIEF SUMMARY

One or more embodiments are directed to a Peak-to-Average Power Ratio (PAPR) optimization system and method (hereinafter may also be termed "mechanism") for digital Frequency Modulation (FM) radio transmission. The disclosed mechanism in the present disclosure includes an Orthogonal Frequency-Division Multiplexed (OFDM) modulator configured to generate the OFDM signal for transmission. A PAPR reduction module applies an adaptive peak-to-average power ratio reduction algorithm to the generated signal, ensuring efficient signal processing. The mechanism further comprises a measurement module that determines the Modulation Error Ratio (MER) for one or more frequency sidebands in the OFDM signal, facilitating real-time signal evaluation. To dynamically adjust and optimize transmission parameters, the mechanism incorporates an optimization servomechanism, which iteratively fine-tunes PAPR reduction parameters based on measured MER values. The optimization servomechanism includes a PAPR reduction iteration controller, which optimizes the number of PAPR reduction iterations for primary digital sidebands, and a QAM constraint controller, which refines constellation constraints for modulated signals. Additionally, a convergence bias controller dynamically adjusts bias weight settings for secondary digital sidebands and/or a lower-powered primary digital sideband to maintain target MER values. The mechanism also integrates a feedback loop module, which continuously updates PAPR reduction parameters in real-time until the measured MER values align with predefined target thresholds.

Further, the mechanism employs a control processor to coordinate the operation of the optimization servomechanism and maintain dynamic PAPR optimization across multiple transmission modes. The control processor executes a multi-phase adaptive optimization algorithm, systematically adjusting PAPR reduction parameters in distinct optimization stages to refine the signal quality. The mechanism is capable of adjusting transmission parameters dynamically based on real-time transmission conditions, ensuring efficient power utilization, signal integrity, and optimal digital FM broadcasting performance.

An embodiment of the present disclosure discloses the PAPR optimization system for digital FM radio transmission. The system includes an Orthogonal Frequency-Division Multiplexed (OFDM) modulator to generate the OFDM signal for transmission. The OFDM modulator plays a crucial role in ensuring efficient frequency-domain signal representation, enabling the application of PAPR reduction techniques. Further, the PAPR optimization system includes a PAPR reduction module to apply an adaptive peak-to-average power ratio reduction algorithm to the generated OFDM signal. The PAPR reduction module ensures that the PAPR reduction is effectively performed before transmission, thereby mitigating nonlinear distortions that may otherwise arise during amplification. The PAPR reduction module operates in conjunction with real-time measurements and feedback to dynamically optimize the PAPR levels.

In an embodiment, the PAPR optimization system includes a measurement module to determine the Modulation Error Ratio (MER) for one or more frequency sidebands in the OFDM signal. By continuously evaluating MER values, the measurement module assesses the impact of PAPR reduction on signal quality. The measured MER values serve as a critical metric for dynamically adjusting transmission parameters, ensuring that the optimized signal maintains high fidelity and low distortion.

In an embodiment, the PAPR optimization system also includes an optimization servomechanism to iteratively adjust one or more PAPR reduction parameters based on the measured MER values. The optimization servomechanism includes a PAPR reduction iteration controller, a QAM constraint controller, and a convergence bias controller, each configured to optimize different aspects of PAPR reduction. The PAPR reduction iteration controller is responsible for optimizing the number of PAPR reduction iterations specifically for a primary digital sideband, ensuring efficient transmission with minimal peak power levels. The QAM constraint controller manages the QAM constellation constraint limits for modulated signals within the OFDM transmission, thereby preventing excessive distortion in higher-order modulation schemes such as 16-QAM and 64-QAM. The convergence bias controller fine-tunes bias weight settings for a lowest-power primary digital sideband and/or secondary digital sidebands, ensuring that lower-power sidebands maintain a stable and predictable signal structure. The optimization servomechanism operates continuously, refining the transmission parameters dynamically to maintain signal integrity.

In an embodiment, the PAPR optimization system also includes a feedback loop module to ensure continuous real-time updates of PAPR reduction parameters. The feedback loop module actively monitors and compares measured MER values against predefined target thresholds, dynamically adjusting parameters to achieve the best possible transmission quality. The feedback loop module is designed to prevent excessive iterations by stopping the optimization process when the measured MER values exceed the predefined target threshold, ensuring efficient convergence and preventing unnecessary computational overhead.

In an embodiment, the PAPR optimization system also includes a control processor in the PAPR optimization system to execute instructions for coordinating the operation of the optimization servomechanism and maintaining dynamic PAPR optimization across multiple transmission modes. The control processor is responsible for executing a multi-phase adaptive optimization algorithm, ensuring that different stages of PAPR optimization are conducted systematically. The optimization occurs in multiple phases, with the PAPR reduction iteration controller optimizing MER for the highest-power primary digital sideband in the first phase, the QAM constraint controller optimizing MER for QAM-modulated signals in the second phase, and the convergence bias controller fine-tuning bias weight adjustments to optimize MER for a lowest-power primary digital sideband and secondary digital sidebands in the third phase. The multi-phase adaptive optimization algorithm is capable of repeating in multiple stages, with each subsequent stage using smaller parameter increment values to refine optimization further. Additionally, the control processor enables real-time adaptation of transmission parameters, allowing the PAPR optimization system to dynamically adjust based on changing transmission conditions, ensuring efficient performance across different FM digital broadcast modes.

An embodiment of the present disclosure discloses the PAPR optimization method for digital FM radio transmission. The method includes the steps of generating the OFDM signal for transmission to facilitate digital FM broadcasting. Further, the method includes the steps of applying an adaptive peak-to-average power ratio reduction algorithm to the generated OFDM signal, ensuring the signal is optimized before transmission. The method further includes the steps of determining a Modulation Error Ratio (MER) for one or more frequency sidebands in the OFDM signal, providing a metric for assessing the effect of PAPR reduction on signal quality for a given set of PAPR reduction parameters.

In an embodiment, the method further includes the steps of adjusting, iteratively, one or more PAPR reduction parameters based on the measured MER values. The adjustment includes the steps of optimizing the number of PAPR reduction iterations for a primary digital sideband, ensuring controlled signal peaks. Further, the method includes the steps of optimizing QAM constellation constraint limits for modulated signals within the OFDM signal, enhancing the integrity of the transmitted data. Additionally, the method includes the steps of adjusting bias weight settings for a lowest-power primary digital sideband and/or secondary digital sidebands to maintain target MER values, ensuring that lower-power sidebands are efficiently managed. The method further includes the steps of updating the PAPR reduction parameters in real-time until the measured MER values meet predefined target MER thresholds. Moreover, the method includes the steps of executing instructions for coordinating the operation of the optimization servomechanism and maintaining dynamic PAPR optimization across multiple transmission modes.

In an embodiment, the method further includes the steps of incrementally adjusting the number of PAPR reduction iterations by a predefined step value until the MER measurement of the primary digital sideband reaches a target MER threshold. Additionally, the method includes the steps of dynamically adjusting iteration values based on hardware processing constraints to optimize power efficiency. The method further includes the steps of incrementally adjusting the distance from a QAM constellation point to its nearest boundary to improve signal integrity, preventing errors in high-order modulation schemes.

In an embodiment, the method further includes the steps for handling a lowest-power primary digital sideband and/or secondary digital sidebands and maintaining signal stability by dynamically adjusting bias weight settings. The method further includes the steps of performing bias weight adjustments using multi-stage incremental optimization, wherein each stage utilizes finer adjustment steps to improve accuracy, allowing for more refined control over the signal's power distribution. Further, the method includes the steps of continuously monitoring and comparing measured MER values against target thresholds and adjusting the PAPR reduction parameters in real-time to ensure signal optimization. The method further includes the steps of stopping iterative adjustments when the measured MER values exceed the predefined target threshold, ensuring efficient convergence of the optimization process.

In an embodiment, the method further includes the steps of executing a multi-phase adaptive optimization algorithm, wherein in a first phase, optimizing the MER of the highest-power primary digital sideband; in a second phase, optimizing MER for 16 and 64 QAM-modulated signals; and in a third phase, fine-tuning convergence bias weight adjustments to optimize MER for lower-power primary and secondary digital sidebands. The method further includes the steps of repeating the multi-phase optimization algorithm in multiple stages, with each subsequent stage using smaller parameter increment values to refine optimization, ensuring gradual fine-tuning of the signal parameters. Further, the method includes the steps of adjusting parameters based on real-time transmission conditions, enabling adaptive tuning across different FM digital broadcast modes, ensuring that the system remains responsive to varying channel conditions, and maintains optimal transmission performance.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
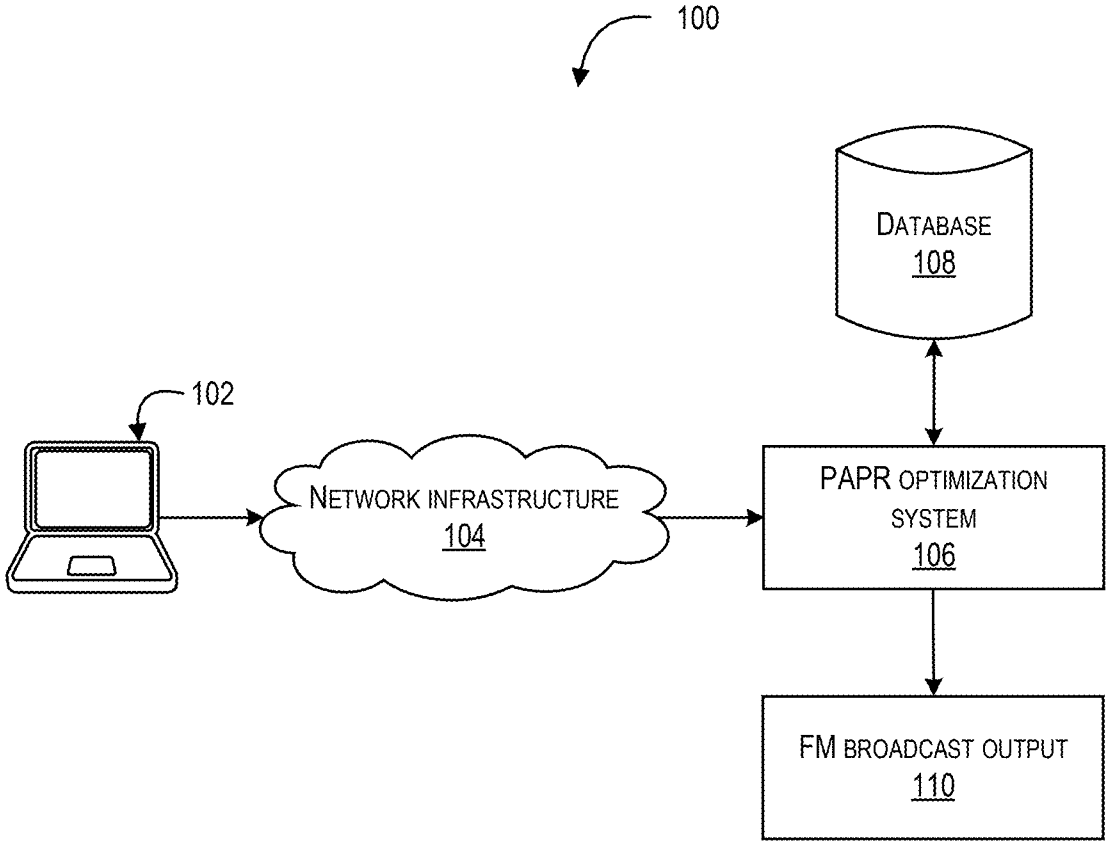
FIG. 1 illustrates an exemplary environment having a Peak-to-Average Power Ratio (PAPR) optimization system for digital Frequency Modulation (FM) radio transmission, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms “connected” or “coupled”, and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature “may”, “can”, “could”, or “might” be included or have a characteristic, that particular component or feature is not required to be included or have the characteristic.

As used in the description herein and throughout the claims that follow, the meaning of “a,” “an,” and “the” includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a Peak-to-Average Power Ratio (PAPR) optimization system and method (hereinafter may also be termed "mechanism") for digital Frequency Modulation (FM) radio transmission. The disclosed mechanism in the present disclosure includes an Orthogonal Frequency-Division Multiplexed (OFDM) modulator configured to generate the OFDM signal for transmission. A PAPR reduction module applies an adaptive peak-to-average power ratio reduction algorithm to the generated signal, ensuring efficient signal processing. The mechanism further comprises a measurement module that determines the Modulation Error Ratio (MER) for one or more frequency sidebands in the OFDM signal, facilitating real-time signal evaluation. To dynamically adjust and optimize transmission parameters, the mechanism incorporates an optimization servomechanism, which iteratively fine-tunes PAPR reduction parameters based on measured MER values. The optimization servomechanism includes a PAPR reduction iteration controller, which optimizes the number of PAPR reduction iterations for the highest-power primary digital sideband, and a QAM constraint controller, which refines constellation constraints for modulated signals. Additionally, a convergence bias controller dynamically adjusts bias weight settings for the lowest-power primary digital sideband and/or secondary digital sidebands to maintain target MER values. The mechanism also integrates a feedback loop module, which continuously updates PAPR reduction parameters in real-time until the measured MER values align with predefined target thresholds.

Further, the mechanism employs a control processor to coordinate the operation of the optimization servomechanism and maintain dynamic PAPR optimization across multiple transmission modes. The control processor executes a multi-phase adaptive optimization algorithm, systematically adjusting PAPR reduction parameters in distinct optimization stages to refine the signal quality. The mechanism is capable of adjusting transmission parameters dynamically based on real-time transmission conditions, ensuring efficient power utilization, signal integrity, and optimal digital FM broadcasting performance.

FIG. 1 illustrates an exemplary environment 100 having a Peak-to-Average Power Ratio (PAPR) optimization system 106 for digital Frequency Modulation (FM) radio transmission, in accordance with an embodiment of the present disclosure.

In an embodiment, the exemplary environment 100 may include a user device 102, a network infrastructure 104, the PAPR optimization system 106, a database 108, and an FM broadcast output 110. In an embodiment, the elements within environment 100 may be connected through wired or wireless communication channels, enabling efficient data transmission and processing. The user device 102 may be any computing device, including but not limited to, a personal computer, workstation, server, or broadcasting terminal. The user device 102 may interact with the PAPR optimization system 106 via the network infrastructure 104. The network infrastructure 104 may include, but is not limited to, a wired or wireless communication network, cloud-based infrastructure, local network, or a combination thereof. Through the network infrastructure 104, the user device 102 may transmit input data related to digital FM radio transmission to the PAPR optimization system 106. The PAPR optimization system 106 may be responsible for processing digital FM signals and optimizing Peak-to-Average Power Ratio (PAPR). The PAPR optimization system 106 may include various components and functionalities, which may be described in more detail in FIG. 2. The PAPR optimization system 106 may dynamically analyze transmission parameters and apply optimization techniques before forwarding the processed signal for further broadcasting.

In an embodiment, the database 108 may store various data related to PAPR optimization, including but not limited to, historical transmission data, predefined threshold values, system configurations, and real-time processing parameters. The PAPR optimization system 106 may retrieve and update data within the database 108 as needed, ensuring adaptive and intelligent decision-making for digital FM transmission. The connection between the database 108 and the PAPR optimization system 106 may be local, cloud-based, or remotely accessible. As the PAPR optimization system 106 processes and optimizes the FM baseband signal, the processed baseband signal may be forwarded to the FM broadcast output 110. The FM broadcast output 110 may represent a transmission system that delivers the processed signal to end-users. The FM broadcast output 110 may include, but is not limited to, FM transmission towers, antennas, satellite transmission systems, or other broadcasting equipment. The optimized FM signal may be transmitted efficiently with improved power efficiency and signal integrity, reducing distortion and maintaining compliance with transmission standards.

In an embodiment, the PAPR optimization system 106 may interact with various components to optimize and enhance digital FM radio transmission. The user device 102 may facilitate input transmission through the network infrastructure 104, while the PAPR optimization system 106 performs PAPR optimization based on data stored within the database 108. The optimized FM signal may be transmitted via the FM broadcast output 110 to reach the intended audience. The overall environment 100 may be implemented in various configurations and may operate across different transmission platforms, without departing from the scope of the disclosure.

Figure 2A:
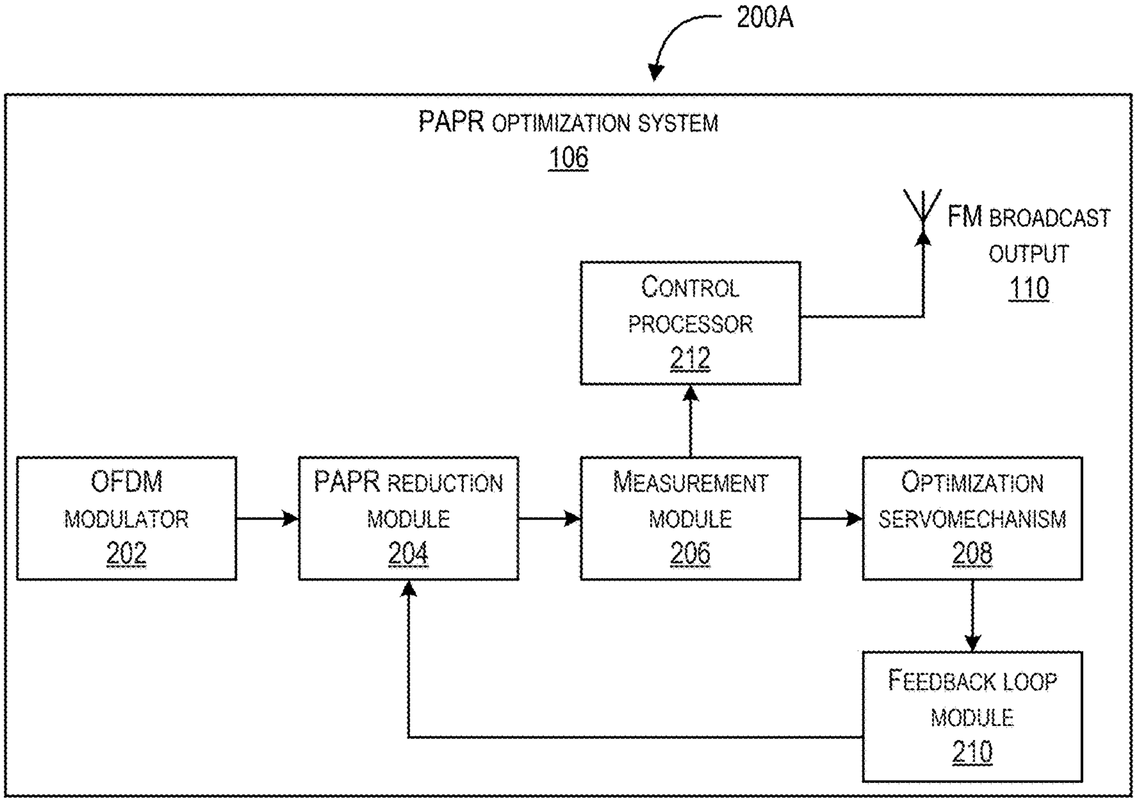
FIG. 2A illustrates a block diagram of the PAPR optimization system for digital FM radio transmission, in accordance with an embodiment of the present disclosure.
Figure 2B:
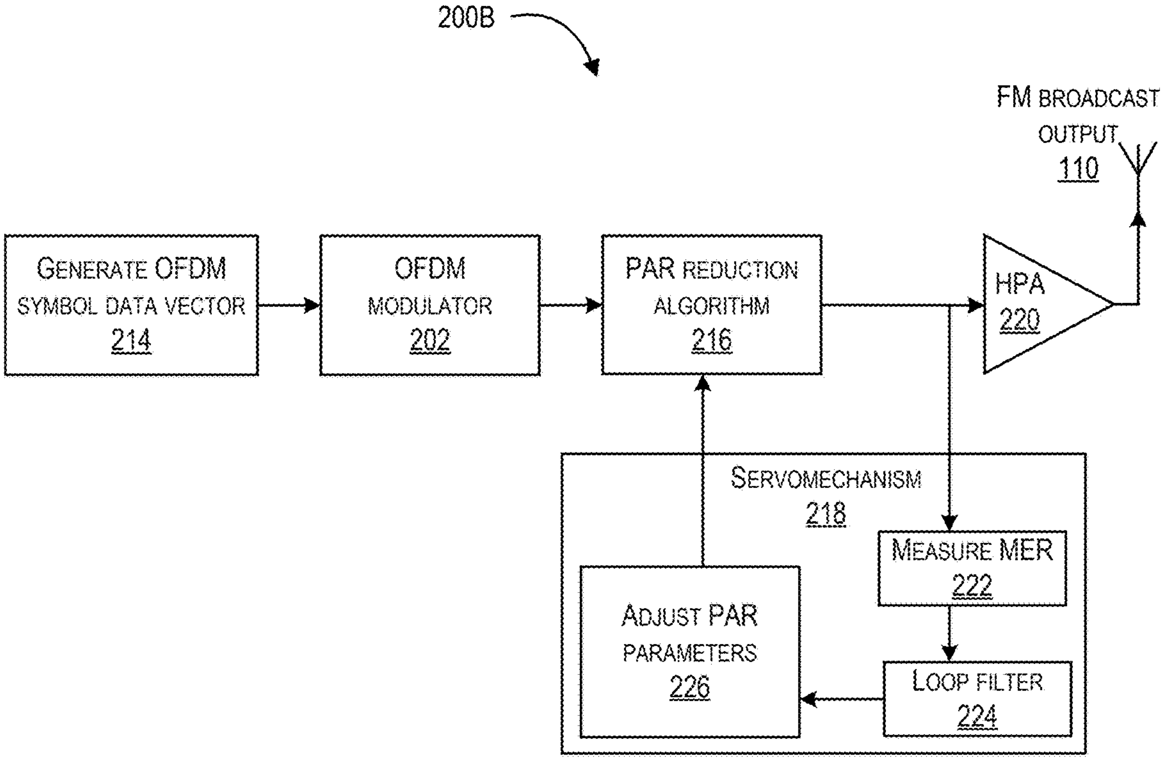
FIG. 2B illustrates an operation of the PAPR optimization system for digital FM radio transmission, in accordance with an embodiment of the present disclosure.

FIG. 2A illustrates a block diagram 200A of the PAPR optimization system 106 for digital FM radio transmission, in accordance with an embodiment of the present disclosure. FIG. 2B illustrates an operation 200B of the PAPR optimization system 106 for digital FM radio transmission, in accordance with an embodiment of the present disclosure. For the sake of brevity, FIGS. 2A and 2B have been explained together.

In an embodiment, the PAPR optimization system 106 (hereinafter may also be termed as the system 106) may include an Orthogonal Frequency-Division Multiplexed (OFDM) modulator 202, a PAPR reduction module 204, a measurement module 206, an optimization servomechanism 208, a feedback loop module 210, and a control processor 212. The OFDM modulator 202, a PAPR reduction module 204, a measurement module 206, an optimization servomechanism 208, a feedback loop module 210, and a control processor 212 may be communicatively coupled to a memory and a processor of the PAPR optimization system 106. The processor may control the operations of the OFDM modulator 202, the PAPR reduction module 204, the measurement module 206, the optimization servomechanism 208, the feedback loop module 210, and the control processor 212.

In an embodiment of the present invention, the processor and the memory may form a part of a chipset installed in the PAPR optimization system 106. In another embodiment of the present invention, the memory may be implemented as a static memory or a dynamic memory. In an example, the memory may be internal to the PAPR optimization system 106, such as an onside-based storage. In another example, the memory may be external to the PAPR optimization system 106, such as cloud-based storage. Further, the processor may be implemented as one or more microprocessors microcomputers, microcomputers, digital signal processors, central processing units, state machines, logic circuitries, and/or any devices that manipulate signals based on operational instructions.

In an embodiment, the OFDM modulator 202 may generate the OFDM signal for transmission and may ensure efficient frequency-domain signal representation, enabling the application of PAPR reduction techniques. The OFDM modulator 202 may process input data, as shown by block 214, by dividing the input data into multiple orthogonal subcarriers, thereby enhancing spectral efficiency and minimizing inter-symbol interference (ISI). Further, the OFDM modulator 202 may support various modulation schemes, including but not limited to Quadrature Amplitude Modulation (QAM) and Phase Shift Keying (PSK), to accommodate different transmission requirements. Furthermore, the OFDM modulator 202 may operate in conjunction with channel coding mechanisms, such as forward error correction (FEC), to improve signal robustness against noise and interference. Moreover, the OFDM modulator 202 may perform adaptive modulation. Additionally, the OFDM modulator 202 may incorporate pilot signals to facilitate accurate channel estimation and equalization, ensuring reliable transmission. The generated OFDM signal may then be processed by the PAPR optimization system 106 to reduce peak power levels while maintaining signal integrity. In an embodiment, the OFDM modulator 202 may be implemented in software, hardware, or a combination thereof, and may be integrated within a transmitter system, a digital signal processing (DSP) unit, or a software-defined radio (SDR) platform. The functionality of the OFDM modulator 202 may be extended to support multiple transmission standards, including but not limited to Digital Audio Broadcasting (DAB), Digital Radio Mondiale (DRM), and other digital FM broadcasting protocols.

In an embodiment, the PAPR reduction module 204 may apply an adaptive peak-to-average power ratio reduction algorithm, as shown by block 216, to the generated OFDM signal. Further, the PAPR reduction module 204 may analyze the signal's peak power levels relative to its average power levels and apply various PAPR reduction techniques to minimize signal distortion while maintaining transmission efficiency. The reduction techniques may include, but are not limited to clipping and filtering, tone reservation, selective mapping (SLM), partial transmit sequences (PTS), active constellation extension (ACE), and coding-based methods. In an embodiment, the PAPR reduction module 204 may ensure that PAPR reduction is effectively performed before transmission, thereby mitigating nonlinear distortions that may otherwise arise during amplification. Further, the PAPR reduction module 204 may consider hardware constraints, such as power amplifier (PA) linearity and efficiency, ensuring that the signal remains within an acceptable range for high-power transmission. Furthermore, the PAPR reduction module 204 may implement adaptive thresholding to control the trade-off between PAPR reduction and bit error rate (BER) performance, ensuring optimal signal quality. In an embodiment, the PAPR reduction module 204 may operate in conjunction with real-time measurements and feedback to dynamically optimize PAPR levels. The dynamic optimization may include continuously monitoring the Modulation Error Ratio (MER), signal-to-noise ratio (SNR), and spectral regrowth characteristics. The PAPR reduction module 204 may adjust PAPR parameters adaptively, facilitating the system 106 to respond to varying transmission equipment conditions and impairments. Additionally, the PAPR reduction module 204 may interact with a control processor to refine optimization settings based on historical transmission data, thereby improving long-term transmission efficiency. Additionally, as shown by block servomechanism 218 in FIG. 2B, the PAPR reduction module 204 may integrate with the Measurement module 206 to allow MER measurements on the PAPR reduced signals. Furthermore, the PAPR reduction module 204 may integrate with the feedback loop module 210 to receive real-time adjustments to PAPR reduction parameters, as shown by block 226, to improve transmission efficiency and signal quality.

In an embodiment, the measurement module 206 may determine the Modulation Error Ratio (MER), as shown by block 222, for one or more frequency sidebands in the OFDM signal. The measurement module 206 may analyze the signal's modulation accuracy, providing real-time feedback on the quality and integrity of the transmitted signal. The MER values may represent signal quality and serve as a key indicator of signal fidelity and transmission efficiency. By continuously evaluating MER values, the measurement module 206 may assess the impact of PAPR reduction on signal quality and identify potential distortions or degradations introduced by the PAPR reduction module 204. Furthermore, the PAPR reduction module 204 may support multi-band measurements. The multi-band measurements may include evaluating the MER separately for primary and secondary digital sidebands, ensuring a comprehensive assessment of transmission performance. The measured MER values may serve as a critical metric for dynamically adjusting transmission parameters and may ensure that the optimized signal maintains high fidelity and low distortion. In an embodiment, the measurement module 206 may integrate with the optimization servomechanism module 208 to compare measured MER values against predefined target thresholds, allowing for real-time adjustments to improve transmission efficiency.

In an embodiment, the optimization servomechanism 208 may adjust one or more PAPR reduction parameters based on the measured MER values. The optimization servomechanism 208 may function as an intelligent control unit within the PAPR optimization system 106, continuously refining transmission parameters to achieve an optimal balance between signal integrity, power efficiency, and spectral performance. Further, the optimization servomechanism 208 may dynamically adapt to real-time transmission conditions, ensuring that PAPR reduction does not compromise modulation accuracy or overall transmission quality. Furthermore, the optimization servomechanism 208 may include a PAPR reduction iteration controller, a QAM constraint controller, and a convergence bias controller, each configured to optimize different aspects of PAPR reduction.

In an embodiment, the PAPR reduction iteration controller may be responsible for optimizing the number of PAPR reduction iterations specifically for a primary digital sideband, ensuring efficient transmission with minimal peak power levels. The PAR iteration controller may iteratively adjust the PAPR reduction iterations based on real-time MER feedback, preventing excessive processing overhead while maintaining a low distortion profile. Further, the PAR iteration controller may also implement adaptive iteration scaling, where iteration values are dynamically adjusted based on signal characteristics and hardware constraints. The QAM constraint controller may manage the QAM constellation constraint limits for modulated signals within the OFDM transmission, thereby preventing excessive distortion in higher-order modulation schemes such as 16-QAM and 64-QAM. The controller may monitor signal degradation metrics, including EVM (Error Vector Magnitude) and constellation drift, ensuring that transmitted symbols remain within the permissible boundary constraints. Additionally, the QAM constraint controller may apply adaptive QAM scaling, where the distance between constellation points is dynamically modified to maintain optimal MER values under varying transmission conditions. The convergence bias controller may fine-tune bias weight settings for a lowest-power primary digital sideband and/or secondary digital sidebands, ensuring that lower-power sidebands maintain a stable and predictable signal structure. The controller may implement bias compensation techniques, dynamically adjusting power levels and weighting factors to prevent signal degradation in multi-band OFDM transmissions. The convergence bias controller may further interact with the feedback loop module 210 to optimize bias settings based on real-time transmission feedback, ensuring that a lowest-power primary digital sideband and/or secondary sidebands do not introduce unnecessary spectral regrowth or adjacent-channel interference.

In an embodiment, the optimization servomechanism 208 may operate continuously, refining the transmission parameters dynamically to maintain signal integrity. The optimization servomechanism 208 may also support multi-phase PAPR optimization, where sequential adjustments to PAPR reduction iteration values, QAM constraint limits, and bias weight settings are performed in multiple stages, allowing for a gradual and controlled optimization process.

In an embodiment, the feedback loop module 210 may ensure continuous real-time updates of PAPR reduction parameters, facilitating the PAPR optimization system 106 to dynamically adapt to changing signal conditions and transmission requirements. The feedback loop module 210 may operate as a closed-loop control mechanism, continuously refining the PAPR optimization process to maintain optimal signal integrity and power efficiency. The feedback loop module 210 may integrate with the measurement module 206 to retrieve Modulation Error Ratio (MER) values and compare them against predefined target thresholds, ensuring that the system 106 operates within the desired performance range. The feedback loop module 210 may actively monitor and compare measured MER values against predefined target thresholds, dynamically adjusting PAPR parameters, as shown by the block 226, to achieve the best possible transmission quality. Additionally, the feedback loop module 210 may employ adaptive thresholding techniques, where MER targets are dynamically adjusted based on historical performance data and real-time transmission conditions. The dynamic adjustments may optimize the system 106 ability to maintain consistent and reliable signal performance.

In an embodiment, the feedback loop module 210 may prevent excessive iterations, through a loop filter as shown by block 224, by stopping the optimization process when the measured MER values exceed the predefined target threshold, ensuring efficient convergence and preventing unnecessary computational overhead. The feedback loop module 210 may implement adaptive iteration control, where the system automatically adjusts the number of PAPR reduction iterations based on processing constraints and performance objectives. Furthermore, the feedback loop module 210 may work in conjunction with the optimization servomechanism 208 to refine PAPR reduction parameters in multiple stages, allowing for a gradual and controlled optimization process that minimizes signal distortion while maintaining power efficiency.

In an embodiment, the control processor 212 may execute instructions for coordinating the operation of the optimization servomechanism and maintaining dynamic PAPR optimization across multiple transmission modes. Further, the control processor 212 may function as the central processing unit of the PAPR optimization system 106, managing real-time signal processing tasks, optimization workflows, and adaptive tuning mechanisms. The control processor 212 may interface with various system components, including the PAPR reduction module 204, measurement module 206, feedback loop module 210, and database 108, to ensure seamless operation and data-driven optimization. The control processor 212 may be responsible for executing a multi-phase adaptive optimization algorithm, ensuring that different stages of PAPR optimization are conducted systematically. The optimization may occur in multiple phases, with each phase targeting specific transmission parameters. In the first phase, the PAPR reduction iteration controller may optimize the highest-power primary digital sideband, ensuring that PAPR reduction iterations are adjusted to maintain efficient power levels without introducing excessive distortions. In a second phase, the QAM constraint controller may optimize the Modulation Error Ratio (MER) for QAM-modulated signals, ensuring that the constellation constraints remain within acceptable limits for high-order modulation schemes, such as 16-QAM and 64-QAM. In the third phase, the convergence bias controller may fine-tune bias weight adjustments for the lowest-power primary digital sideband and/or secondary digital sidebands, ensuring stable and predictable signal structure across multi-band OFDM transmission environments.

In an embodiment, the multi-phase adaptive optimization algorithm may be capable of repeating in multiple stages, with each subsequent stage using smaller parameter increment values to refine optimization further. The control processor 212 may incorporate machine learning-based adaptation or historical data analysis techniques, allowing the system 106 to progressively improve transmission quality over time. Additionally, the control processor 212 may manage resource allocation for different processing tasks, ensuring that real-time optimizations do not introduce unnecessary computational delays. Further, the control processor 212 may enable real-time adaptation of transmission parameters, allowing the PAPR optimization system 106 to dynamically adjust based on changing transmission conditions. This may include adapting to variations in channel conditions, power amplifier (such as a High-Power Amplifier (HPA), as shown by block 220) linearity constraints, network congestion levels, and environmental factors that influence FM signal propagation via the FM broadcast output 110. The control processor 212 may also integrate with cloud-based or remotely accessible data management systems, enabling remote monitoring, parameter tuning, and over-the-air (OTA) updates for continuous system improvements.

Figure 3:
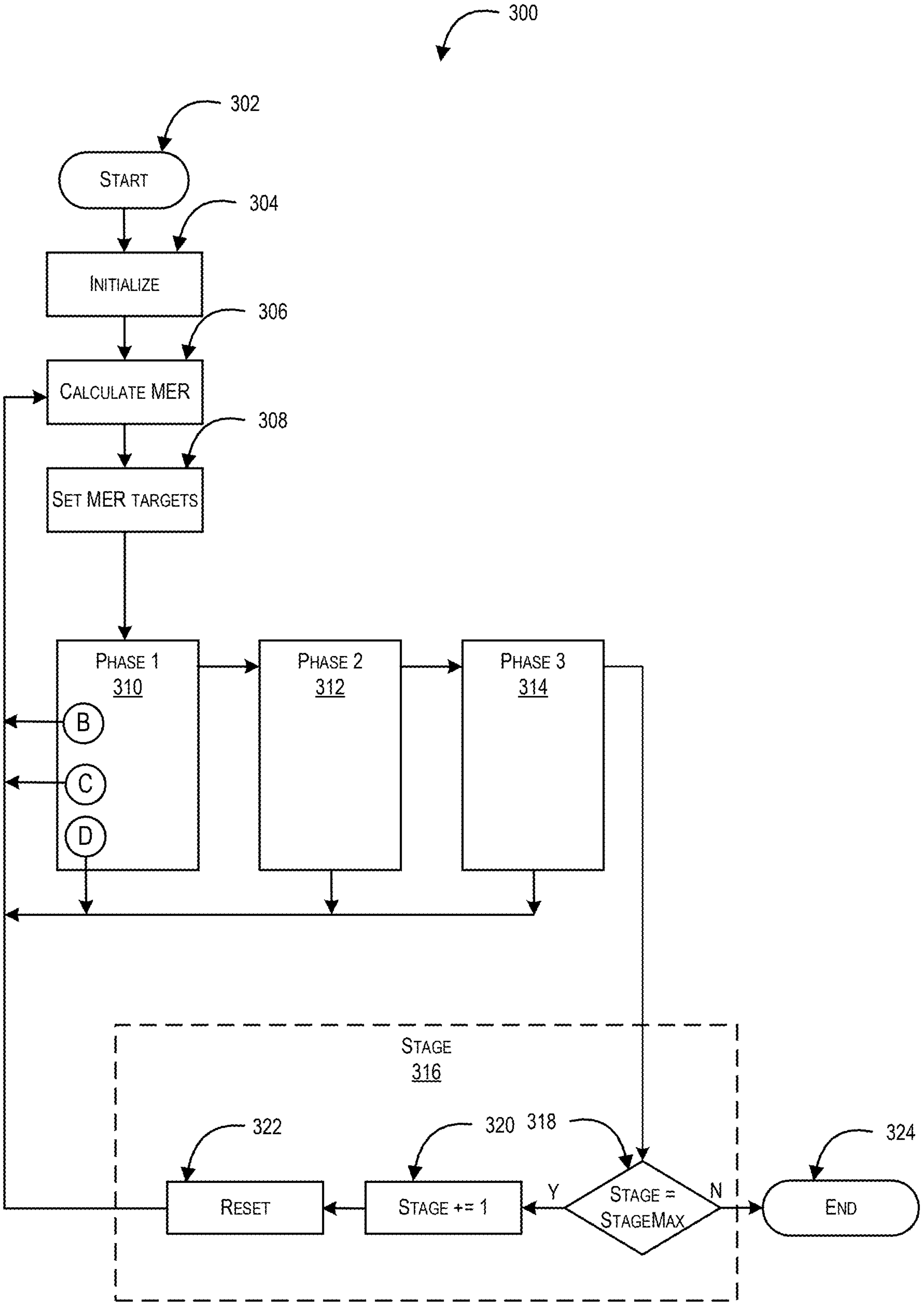
FIG. 3 is a flow chart of an operation of an optimization servomechanism, in accordance with an embodiment of the present disclosure.

FIG. 3 is a flow chart 300 of an operation of the optimization servomechanism 208, in accordance with an embodiment of the present disclosure. The process may begin at step 302.

At step 304, the operation of the optimization servomechanism 208 includes initializing system parameters to prepare the PAPR optimization system 106 for processing. The initialization may involve setting default values, retrieving stored optimization parameters, and establishing communication with system components. Further details regarding the initialization process will be described in the following paragraphs in conjunction with FIGS. 4A-4B.

Once initialized, the process may proceed to a MER calculation at step 306, where the measurement module 206 may determine the Modulation Error Ratio (MER) of the OFDM signal. The MER values may provide insight into signal integrity and modulation accuracy, forming the basis for subsequent PAPR reduction parameter adjustments. Following the MER calculation, the system may proceed to set MER targets, at step 308, to define threshold values that the system aims to achieve during PAPR optimization. Such MER targets may be based on predefined system constraints, real-time transmission conditions, or adaptive learning models. A more detailed explanation of setting the MER target and its impact on optimization will be described in the following paragraphs in conjunction with FIGS. 8A-8B.

Next, the optimization process may proceed through a multi-phase approach, i.e., phase 1 310, phase 2 312, and phase 3 314. Each phase may be responsible for adjusting specific PAPR reduction parameters and optimizing different aspects of the transmitted signal to meet the predefined MER targets. The first phase 310 may focus on initial parameter tuning such that an increase in PAPR reduction iterations causes a decrease in the measured MER, the second phase 312 may refine modulation-specific constraints such that an increase in QAM constraint limit causes an increase in measured MER, and the third phase 314 may perform final adjustments to ensure transmission stability such that an increase in CB weight may cause an increase in measured MER. In an embodiment, once phase 1 is complete, phase 2 and phase 3 are performed in a similar manner. Further, when all three phases have been completed, the entire three-phase process is repeated for stage 2 using the smaller parameter increment values as described below. Furthermore, the process is flexible in that more than 2 stages can be incorporated with different increment values and target MERs. The specific functions and operations performed in each optimization phase will be discussed in more detail in conjunction with FIGS. 5, 6A-6C, and 7A-7C.

Next, to ensure a controlled and structured optimization process, the optimization servomechanism 208 may implement a stage-based approach 316, where the process may iterate through multiple stages to fine-tune the optimization settings. Each iteration may refine PAPR reduction parameters incrementally until the system converges to an optimal state. After each iteration, the stage counter may be incremented, as shown by 320, and the system may evaluate whether the maximum number of optimization stages (StageMax) has been reached, as shown by 318. If additional optimization is required, the process may continue through another iteration cycle; otherwise, the process may proceed to completion.

If at any point the system 106 determines that further adjustments are required, a reset operation, as shown by 322, may be performed to restore initial conditions before restarting the optimization process. The reset operation may ensure that the PAPR optimization system 106 does not converge to a suboptimal state and may be configured to selectively reset specific parameters while preserving historical optimization data. Further explanation of the reset operation and its impact on convergence stability will be detailed in more detail in conjunction with FIG. 9.

Upon completing the multi-stage optimization process, the system 106 may reach an end operation, as shown by 324, where the final PAPR-optimized signal may be transmitted via the FM broadcast system.

Figure 4A:
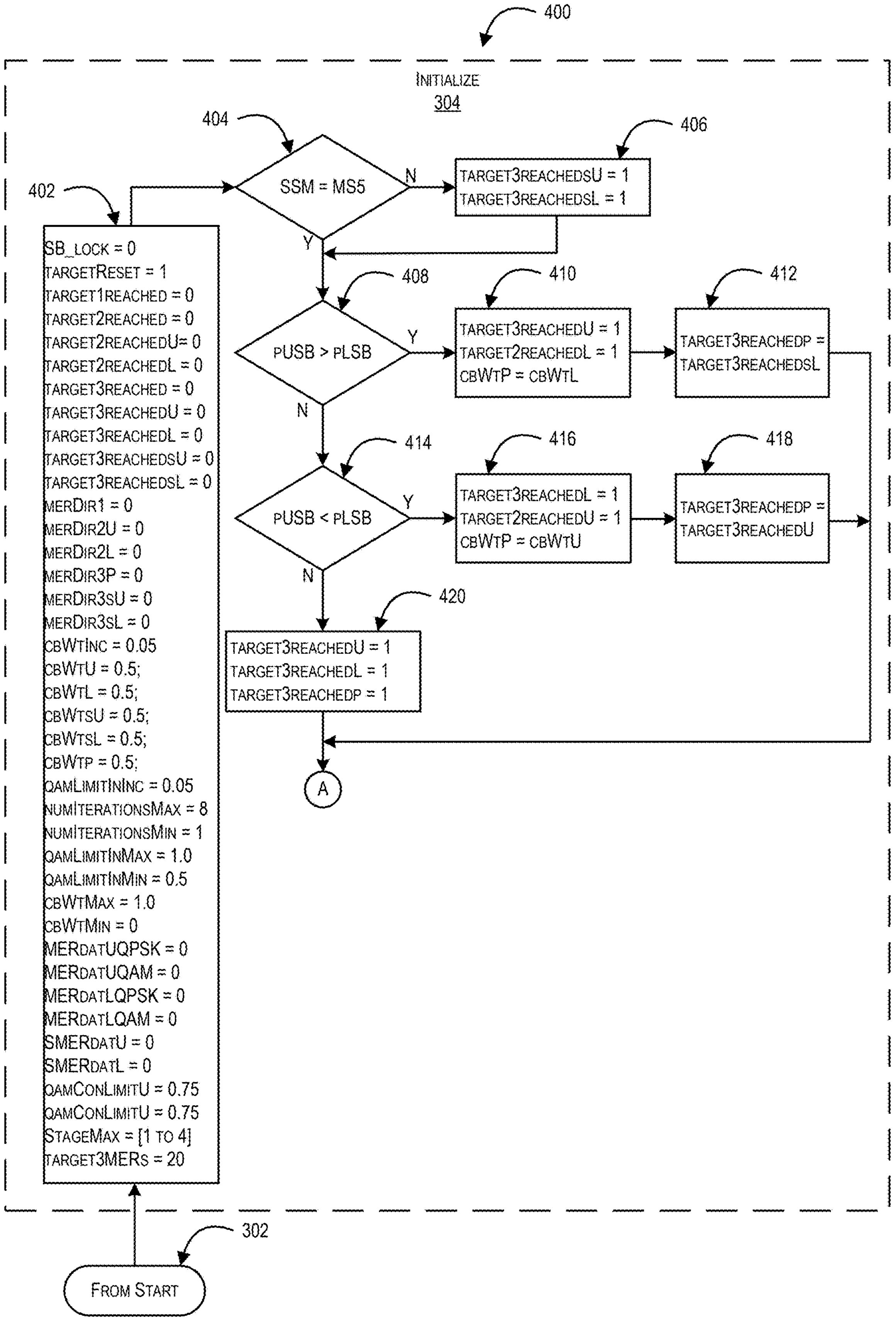
FIGS. 4A-4B is a flow chart of an operation of initialization in the optimization servomechanism, in accordance with an embodiment of the present disclosure.
Figure 4B:
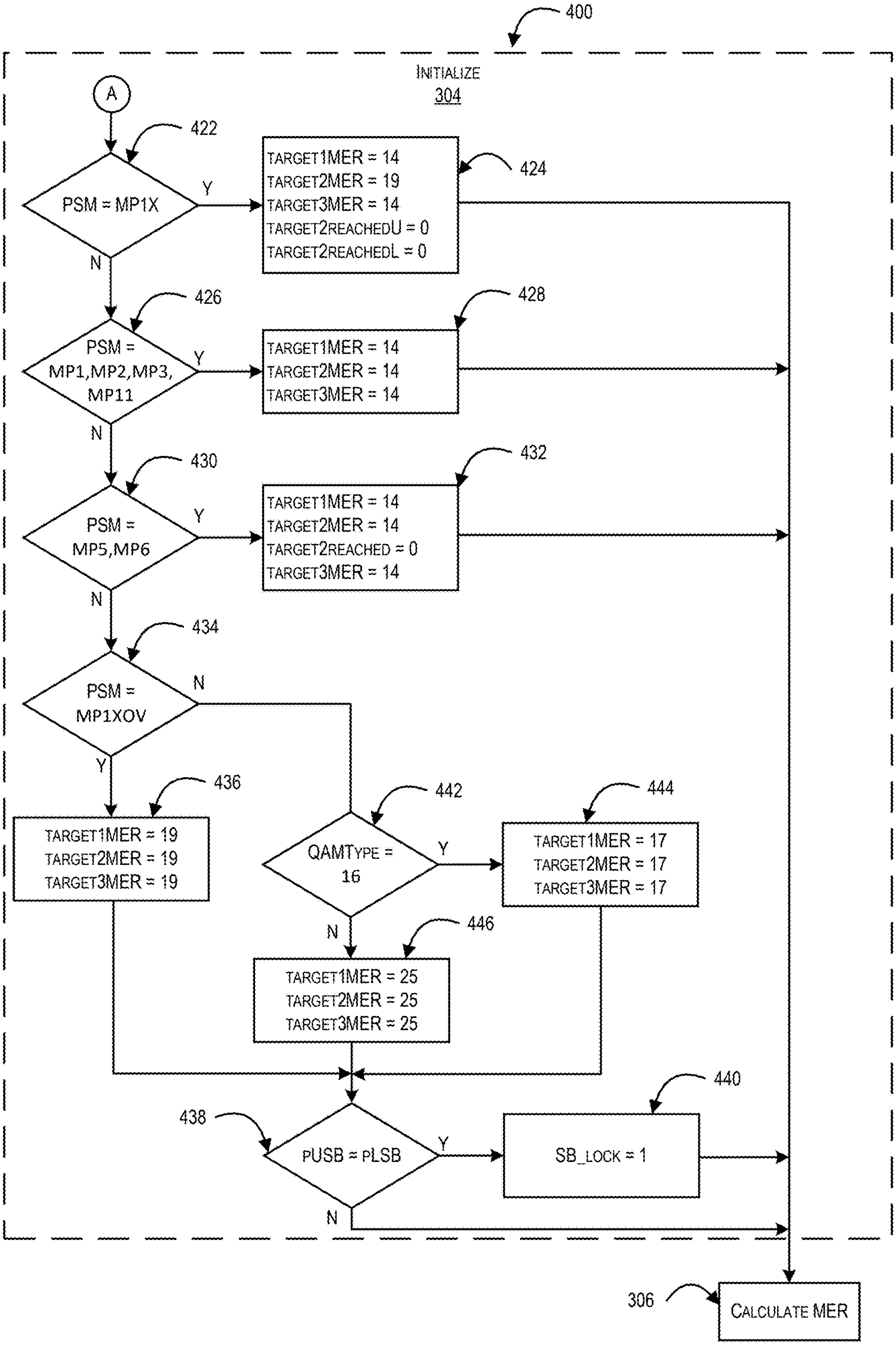

FIGS. 4A-4B is a flow chart 400 of an operation of initialization in the optimization servomechanism, in accordance with an embodiment of the present disclosure. The initialization process may establish the initial conditions necessary for PAPR optimization and ensure that the system parameters are configured for effective operation. Further, the process may involve setting default values, defining threshold conditions, and determining system-specific configurations before proceeding to the MER calculation and iterative optimization phases.

In an embodiment, the initialization process may begin at block 402, where system parameters may be set to default values. These parameters may include, but are not limited to, target thresholds, modulation constraints, and control variables for the optimization servomechanism 208. The initialization process may then proceed to a decision block 404, where the system may determine if SSM=MSS. If no, then the MER target reached values may be assigned for secondary upper and lower sidebands, as shown by block 406. Or else, further conditional checks may be performed. Next, the system may determine, as shown by block 408, if PUSB>PLSB. If yes, specific MER target reached values and weight parameters may be assigned accordingly, as shown by blocks 410 and 412. Similarly, if PUSB<PLSB, as shown by block 414, then a different set of MER target reached values and weight parameters may be applied, as shown by blocks 416 and 418. If neither condition is met, a default assignment of MER target reached values may be performed, as shown by block 420, ensuring that the system initializes properly regardless of power distribution conditions.

In an embodiment, the initialization process may continue at decision block 422, where the system 106 may evaluate if PSM=MP1X. If yes, then the specific target MER values and MER target reached values may be assigned at block 424. Otherwise, additional mode-specific evaluations may be performed at blocks 426, 430, and 434, covering different modulation and transmission schemes such as MP1, MP2, MP3, MP11, MP5, MP6, and MP1XOV. Each of these modes may correspond to specific target MER values, as shown by blocks 428, 432, and 436, ensuring that the system operates according to the transmission conditions and requirements. If none of the transmission schemes evaluated in decision blocks 422, 426, 430, or 434 were "Y", the initialization process may further evaluate the Quadrature Amplitude Modulation (QAM) type at decision block 442. If QAM type=16, then corresponding target MER values may be assigned at block 444. Otherwise, higher target MER values may be applied at block 446, ensuring that higher-order QAM schemes receive appropriate signal quality constraints.

In an embodiment, before proceeding to the MER calculation phase 306, the system may perform an additional comparison of power levels between the upper and lower primary sidebands, as shown by block 438. If necessary, a sideband lock condition may be set at block 440, restricting further parameter modifications in subsequent phases. Once all initialization conditions have been met, the system may transition to the MER calculation step 306, where the measurement module 206 may determine the actual MER values for further optimization.

Figure 5:
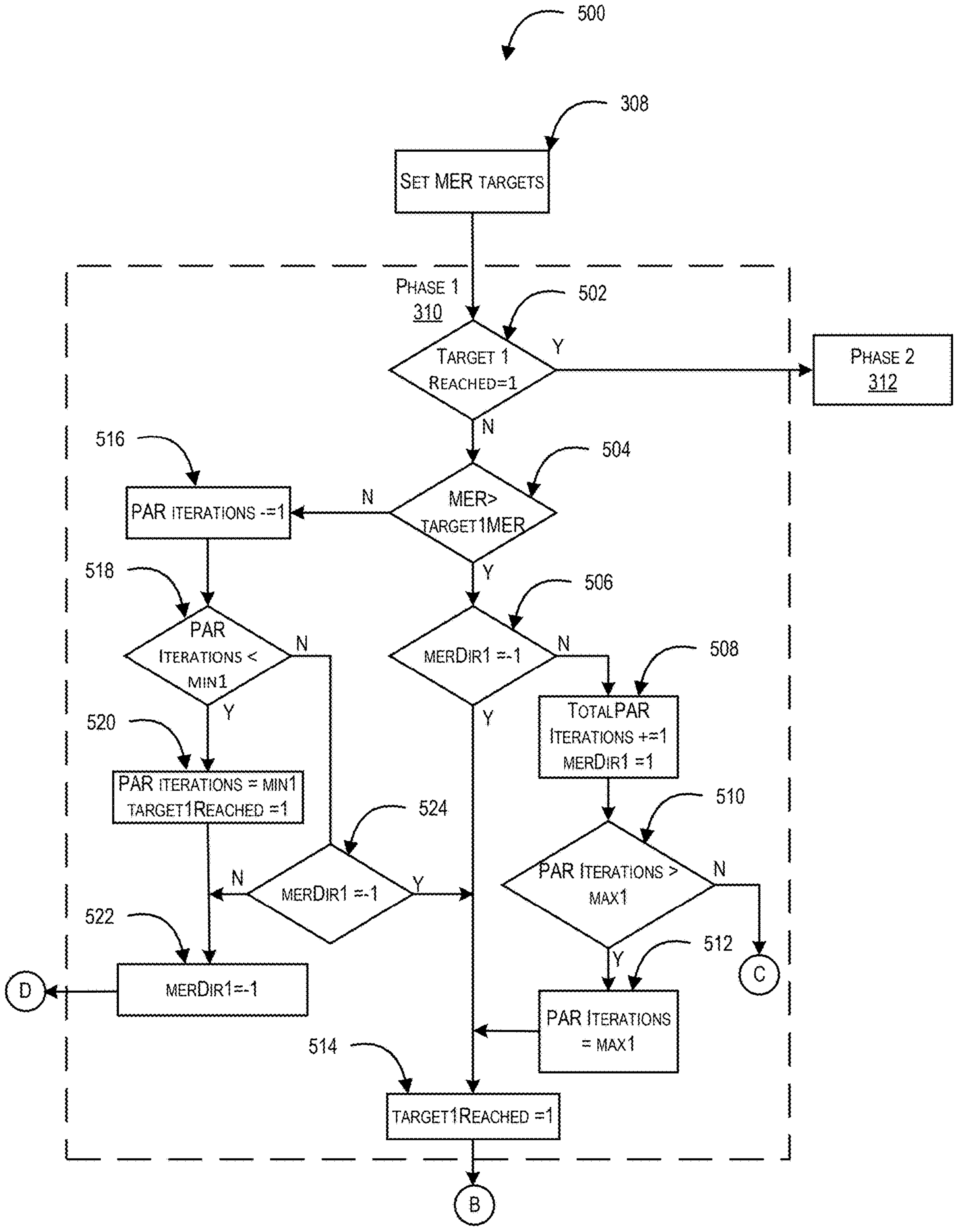
FIG. 5 is a flow chart of an operation of phase 1, in accordance with an embodiment of the present disclosure.

FIG. 5 is a flow chart 500 of an operation of phase 1, in accordance with an embodiment of the present disclosure. In an embodiment, phase 1 310 is responsible for optimizing PAPR reduction iterations to achieve the predefined target Modulation Error Ratio (MER) set during initialization. The phase 1 ensures that the PAPR optimization system 106 dynamically adjusts PAPR parameters based on real-time MER feedback before proceeding to subsequent optimization phases.

In an embodiment, the process begins by verifying whether Target 1 has been reached, as shown by block 502. If the MER target condition has been satisfied, the process transitions directly to Phase 2 312. Otherwise, the system 106 proceeds with further iterative adjustments to optimize PAPR reduction iterations. In further optimization, the system determines whether the current MER value exceeds the target MER threshold, at decision block 504. If the condition is met, the system 106 checks the MER direction flag (MERDIR1), at block 506, to evaluate whether previous iterations have improved MER values as far as possible. If the MER direction flag indicates improvements are complete, it finalizes the target MER condition, as shown by block 514, and proceeds back to Calculate MER 306. Otherwise, the system 106 increments the total PAPR reduction iterations, as shown by block 508, and changes the MER direction flag, allowing the PAPR reduction process to continue refining the signal if the PAPR reduction iterations have not reached MAX1 Next, the system 106 evaluates whether the PAPR reduction iterations have reached the maximum allowable limit (MAX1), as shown by block 510. If the maximum limit has not been reached, the system exits the phase 1 loop to proceed back to 306, otherwise, it sets the PAPR reduction iterations to MAX1 and finalizes the target MER condition, as shown by block 514, and returns to 306.

In an embodiment, if the condition at block 504 is not satisfied (i.e., MER does not exceed TARGET1MER), the system 106 proceeds to block 516, where it decrements PAPR reduction iterations to refine the optimization process. The system 106 evaluates whether the PAR iteration<MIN1 at decision block 518. If so, the process sets the PAPR reduction iteration count to its minimum allowable value (MIN1) and sets Target 1 as reached at block 520. Then the system 106 also sets MERDIR1 to −1, as shown by block 522, and proceeds back to Calculate MER 306. Otherwise, the MER direction flag is evaluated, as shown by block 524. If the MER direction flag is already −1, the MER target reached condition is finalized and the system 106 proceeds back to Calculate MER 306. Otherwise, the system 106 sets MERDIR to −1 in block 522 and proceeds back to Calculate MER 306.

Figure 6A:
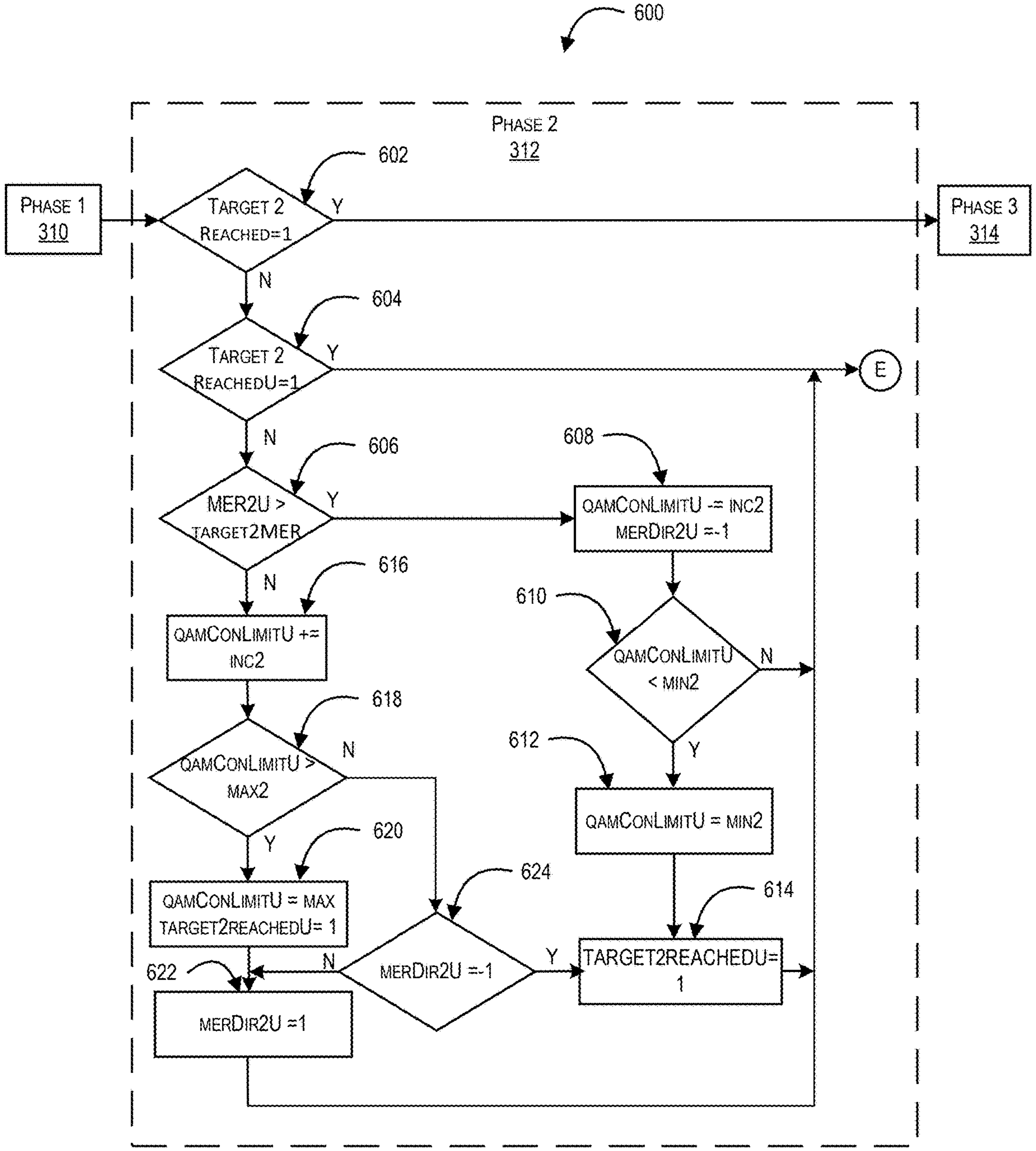
FIGS. 6A-6C are a flow chart of an operation of phase 2, in accordance with an embodiment of the present disclosure.
Figure 6B:
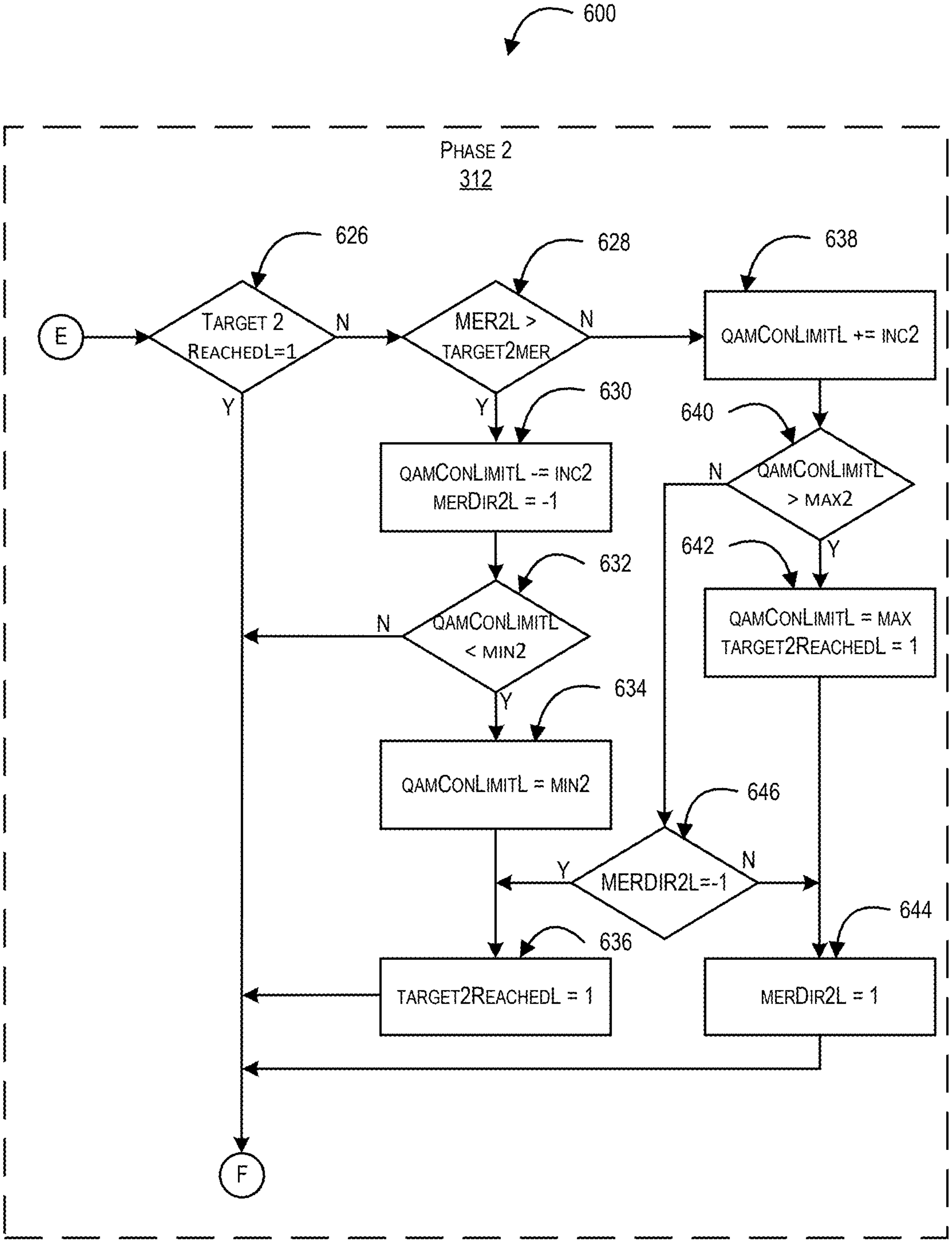
Figure 6C:
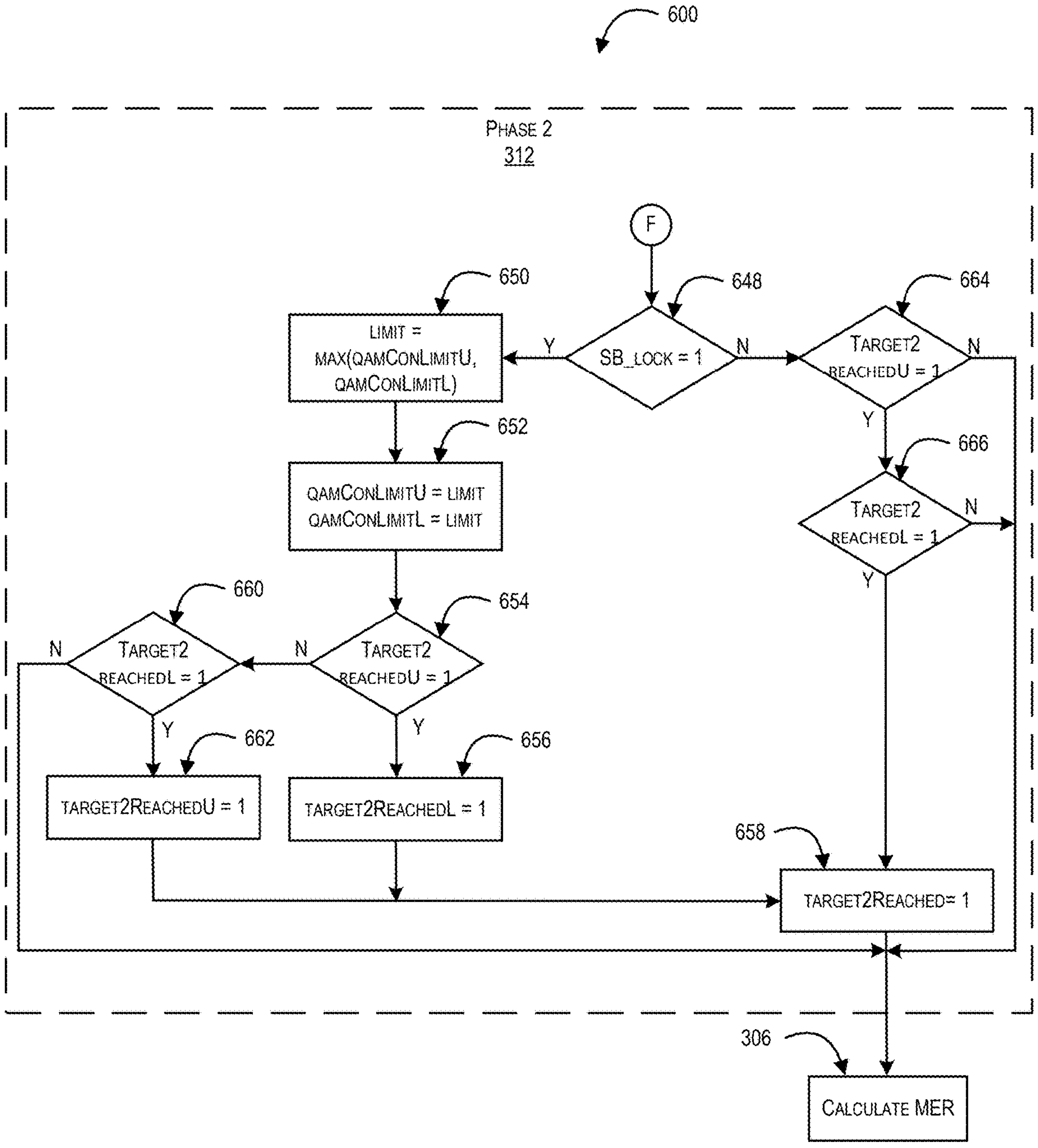

FIGS. 6A-6C are a flow chart 600 of an operation of phase 2, in accordance with an embodiment of the present disclosure.

In an embodiment, at first, the system evaluates whether Target 2 has been reached, at block 602. If yes, then the process transitions to phase 3 314 for further convergence bias weight optimization. If not, the system checks if Target 2 upper is already satisfied, at block 604. Otherwise, the system 106 continues refining QAM constellation constraints based on the measured MER values. Next, at decision block 606, the system 106 compares the upper sideband MER (MER2U) against the predefined TARGET2MER threshold. If MER2U exceeds Target2MER, the system 106 decrements the upper-sideband QAM constellation limit (QAMCONLIMITU) by INC2, as shown by block 608, and the MER direction flag (MERDir2U) is updated to indicate a downward adjustment. The system 106 then evaluates whether QAMCONLIMITU has dropped below the minimum threshold (MIN2), as shown by block 610. If so, the system 106 assigns QAMCONLIMITU=MIN2 in block 612 and proceeds to block 614 to flag Target 2 upper as reached (TARGET2REACHEDU=1). Otherwise, if MER2U does not exceed Target2MER, then the process increments QAMCONLIMITU by INC2, as shown by block 616, and proceeds to check if QAMCONLIMITU has exceeded the maximum limit (MAX2), as shown by block 618. If yes, it is assigned QAMCONLU=MAX2, as shown by block 620, ensuring it does not exceed predefined operating conditions. In addition, in box 620, Target 2 upper is flagged as reached (TARGET2READCHEDU=1). Next, at block 622, the system 106 sets the MER direction flag MERDir2U to 1 and proceeds to decision block 626 on FIG. 6B. If the decision at block 618 is no, the process moves to a decision block 624 to check if MERDIR2U=−1. If yes, then the process moves to block 614 and sets TARGET2REACHEDU=1 and proceeds to decision block 626 on FIG. 6B. If no, the process moves to block 622 and sets MIRDIR2U to 1 and proceeds to decision block 626 on FIG. 6B.

In an embodiment, at decision block 626, the system 106 checks if Target 2 has been reached for the lower sideband (Target2ReachedL=1). If no, MER2L is compared against Target2MER at block 628. If MER2L exceeds Target2MER, the system decreases the lower-sideband QAM constellation limit (QAMCONLIMITL) by INC2, as shown by block 630, and the MER direction flag (MERDIR2L) is updated to −1 to reflect this change. The process then verifies whether QAMCONLIMITL has fallen below the minimum threshold, as shown by block 632. If not, system 106 proceeds to decision block 648 on FIG. 6C. If so, QAMCONLIMITL is set to MIN2, as shown by block 634, and Target 2 is flagged as reached, as shown by block 636. The system 106 then proceeds to decision block 648 on FIG. 6C. If the MER condition at block 628 is not satisfied, the system increments QAMCONLIMITL by INC2, as shown by block 638, ensuring that MER optimization remains within acceptable bounds. The process then checks if QAMCONLIMITL has exceeded the predefined MAX2 threshold, as shown by block 640. If so, QAMCONLIMITL is assigned MAX2, and Target 2 lower is flagged as reached, as shown by block 642. Then MERDIR2L is set to 1 in block 644 and the system 106 proceeds to decision block 648 on FIG. 6C. If additional refinements are necessary, the system 106 evaluates whether MERDIR2L=−1, as shown by block 646. If so, Target 2 lower is set to reached, as shown by block 636, and the system 106 then proceeds to decision block 648 on FIG. 6C. If no, MERDIR2L is set to 1, and the system 106 then proceeds to decision block 648 on FIG. 6C.

In an embodiment, at decision block 648, the system 106 checks whether the sideband lock condition (SB_LOCK=1) has been set. If SB_LOCK is active, further modifications to QAM constellation constraints may be restricted, ensuring system stability. At block 650, the system 106 assigns LIMIT based on the maximum value between QAMCONLIMITU and QAMCONLIMITL.

This ensures that both sidebands maintain synchronized constellation constraints, preventing imbalanced signal distortions. The finalized QAM limits are then assigned at block 652, setting both QAMCONLIMITU and QAMCONLIMITL to the determined limit value. The system 106 then verifies whether Target 2 has been reached (as shown by blocks 654, 656, 660, and 662). If either Target2 upper or Target 2 lower target conditions have been satisfied, the other target 2, TARGET2REACHEDU or TARGET2REACHEDL, is flagged accordingly as shown in blocks 662 and 656. Then Target 2 reached is set in box 658. The system 106 then proceeds back to the Calculate MER block 306. If SB_LOCK is not active, then the system 106 sets TARGET2REACHED if BOTH TARGET2REACHEDL and TARGET2REACHEDU are set, as shown in block 658 and decision blocks 664 and 666.

Figure 7A:
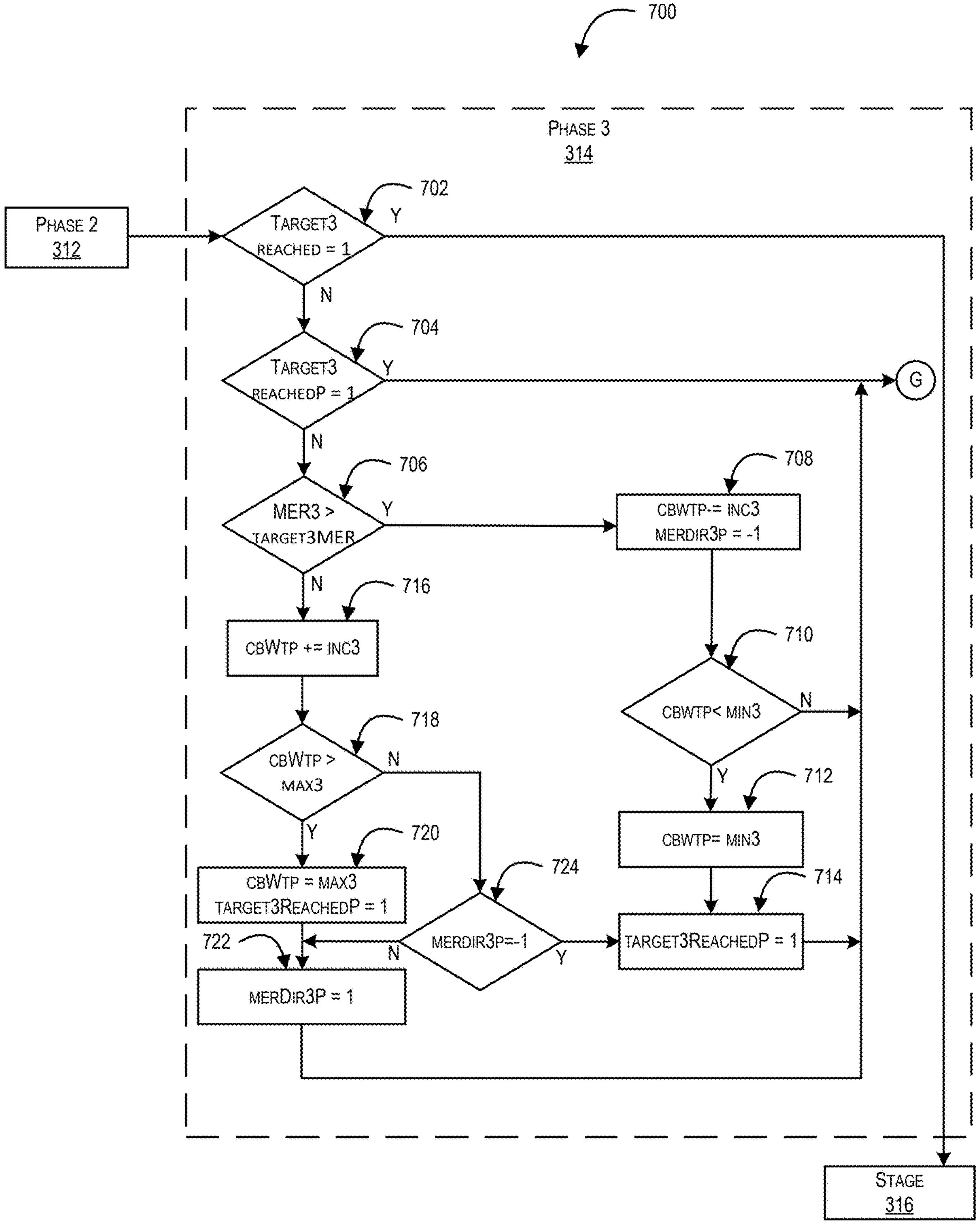
FIGS. 7A-7C are a flow chart of an operation of phase 3, in accordance with an embodiment of the present disclosure.
Figure 7B:
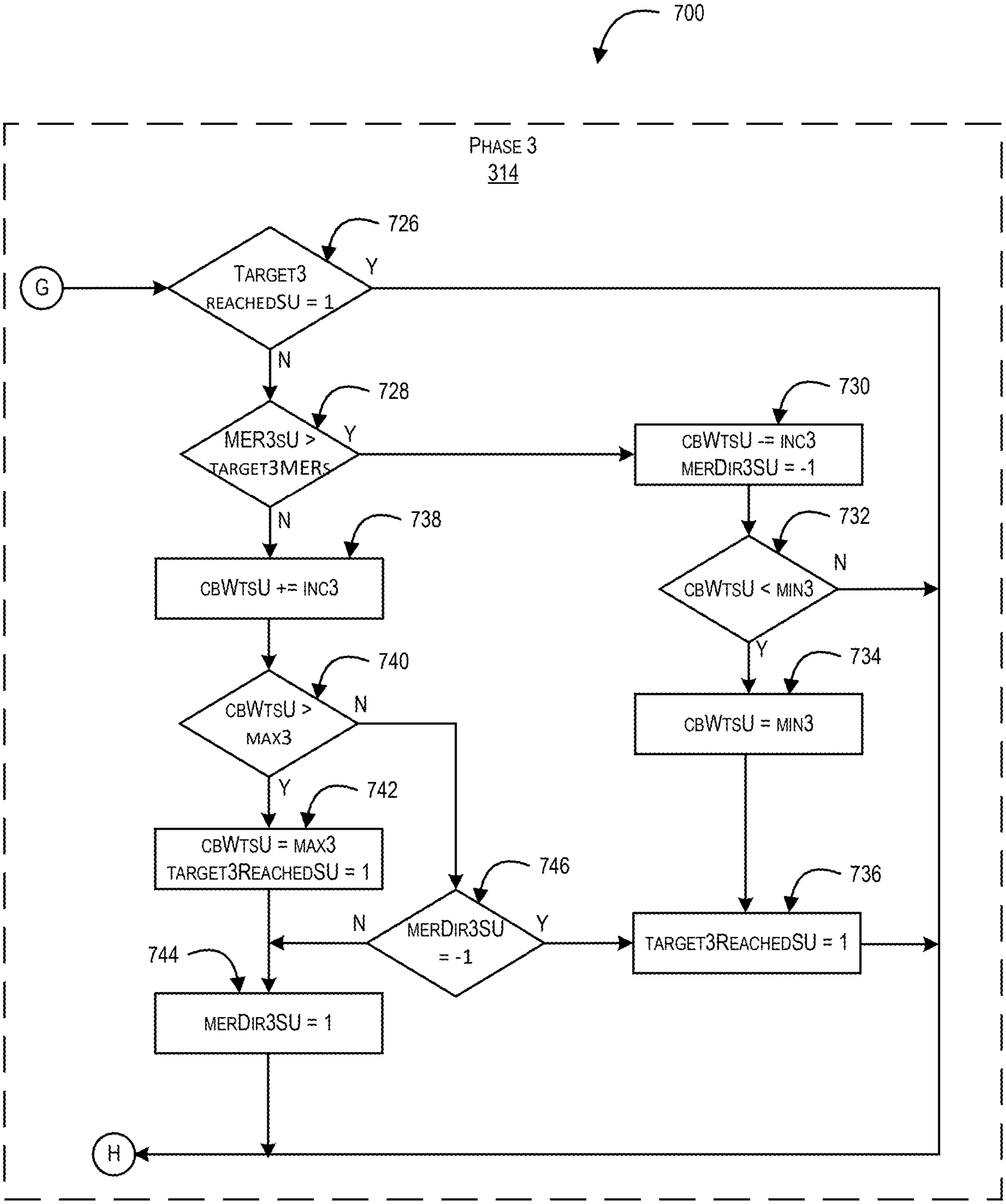
Figure 7C:
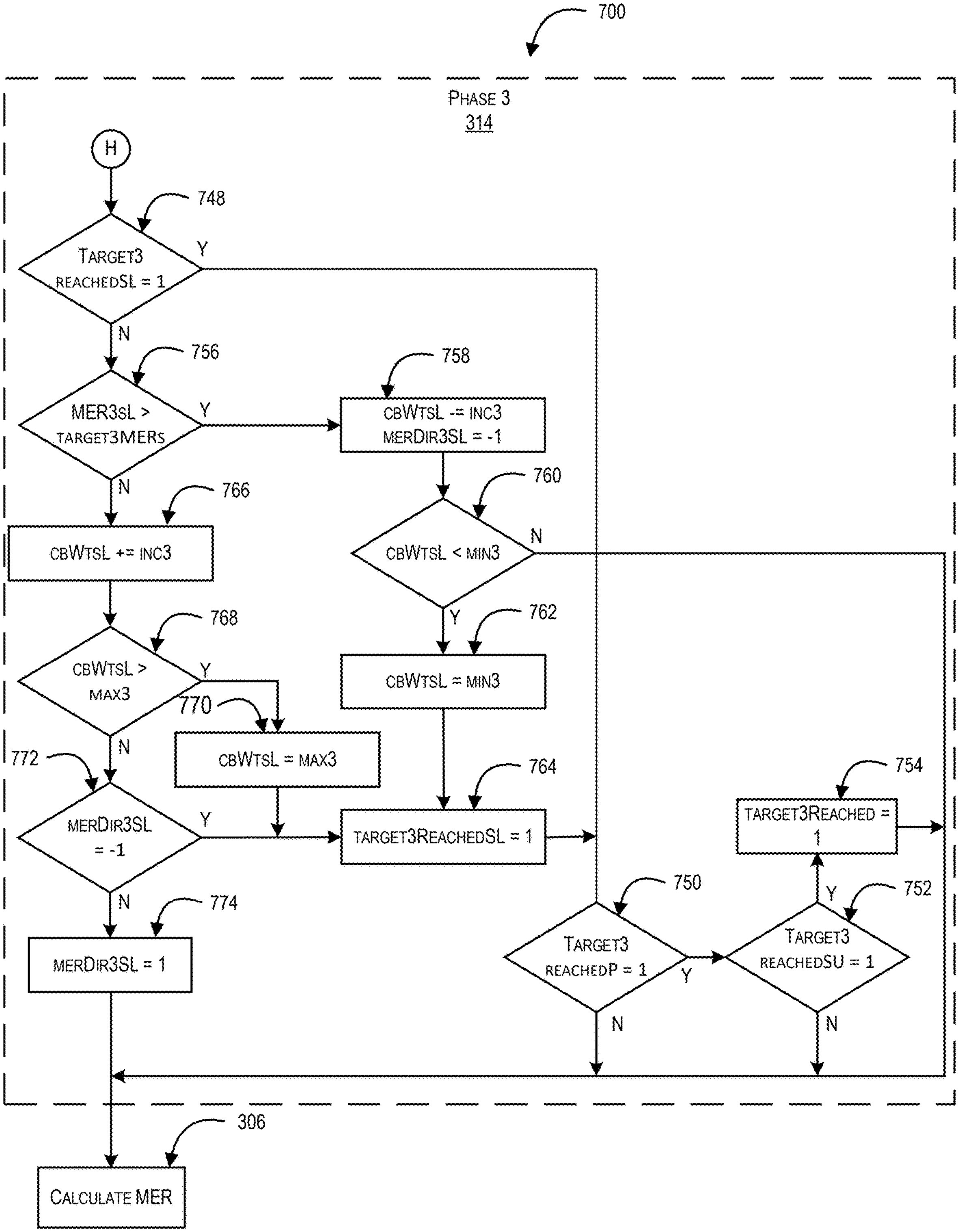

FIGS. 7A-7C are a flow chart 700 of an operation of phase 3, in accordance with an embodiment of the present disclosure. Phase 3 314 is responsible for fine-tuning convergence bias weight adjustments for lowest-power primary digital sideband and/or secondary digital sidebands, ensuring that lower-power sidebands maintain stability while minimizing distortion. Further, the phase 3 optimizes convergence bias weight parameters (CBWTP, CBWTSU, CBWTSL) based on real-time Modulation Error Ratio (MER) feedback, allowing for adaptive transmission parameter refinement before the final MER calculation step 306.

In an embodiment, the process begins at block 702, where the system 106 checks whether Target 3 has been reached (TARGET3REACHED=1). If Target 3 is already satisfied, the system 106 proceeds to finalize the optimization process. Otherwise, the system 106 proceeds to decision block 704 to check if Target 3 has already been reached for the lowest-power primary sideband. If not, the system 106 moves to decision block 706, where the system 106 evaluates whether the measured MER3 value exceeds the target threshold (TARGET3MER). If the measured MER3 value does not exceed the target threshold, the system 106 increments the primary convergence bias weight parameter (CBWTP) by a predefined increment (INC3) at block 716. This adjustment ensures that the bias weight compensation aligns with real-time signal conditions, maintaining transmission quality. The system 106 evaluates at decision block 718 whether CBWTP has exceeded the maximum allowable threshold (MAX3). If the limit is not exceeded, it moves on to decision block 724 to check if MERDIR3P=−1. If yes, it sets TARGET3REACHEDP to 1 as shown in block 714. However, if the maximum allowable threshold is exceeded, the system 106 sets CBWTP to MAX3 and TARGET3REACHEDP to 1 at block 720, and updates the MER direction flag (MERDIR3P=1) at block 722, finalizing primary convergence bias weight adjustments. If the MER condition is not met at decision block 706, the system 106 reduces CBWTP by INC3 and checks at decision block 710 whether it has fallen below the minimum threshold (MIN3). If so, the system 106 sets CBWTP=MIN3 at block 712 and confirms that Target 3 has been reached at block 714 for the primary sideband.

Following primary-sideband convergence bias weight adjustments, the system 106 proceeds to optimize the secondary upper-sideband convergence bias weight settings. At decision block 726, the system 106 verifies whether TARGET3REACHEDSU=1. If the condition is met, it proceeds to decision block 748 on FIG. 7C. If MER3SU exceeds TARGET3MERS, the system 106 decrements the upper-sideband bias weight (CBWTSU) at block 730. At decision block 732, the system 106 checks whether CBWTSU is below the minimum threshold (MIN3). If so, it sets CBWTSU=MIN3 at block 734, and sets TARGET3REACHEDSU to 1, as shown in block 736. At decision block 728, if MER3SU does not exceed TARGET3MERS, the system 106 increases CBWTSU by INC3, as shown at block 738. Further, if the convergence bias weight exceeds MAX3 at decision block 740, the system 106 assigns MAX3 at block 742 and flags Target 3 as reached for the upper secondary sideband. It then proceeds to block 744 and sets MERDIR3SU to 1, and advances to block 748 on FIG. 7C. If it does not exceed MAX3, it proceeds to decision block 746 to check if MERDIRSU=−1. If not, it sets MERDIRSU=1 at block 744. If yes, it sets TARGET3REACHEDSU to 1 at block 736. Once all adjustments are complete, the system 106 proceeds to secondary lower sideband optimization at block 748 on FIG. 7C.

At decision block 748, the system 106 verifies whether Target 3 has been reached for the secondary lower sideband (TARGET3REACHEDSL=1). If not, the MER3SL value is compared against TARGET3MERS at block 756. If the measured MER value exceeds the target, the secondary lower sideband convergence bias weight (CBWTSL) is decreased by INC3 at block 758, and MERDIR3L is set to −1. The system then evaluates at decision block 760 whether CBWTSL is below MIN3. If so, it sets CBWTSL=MIN3 at block 762 to prevent excessive convergence bias reduction and sets the secondary lower target 3 reached as 1, as shown by block 764. At block 756, if the measured MER value does not exceed the target, the system 106 increases CBWTSL by INC3 at block 766, to improve stability and keep the signal clear. If the convergence bias weight has reached MAX3 at decision block 768, the system assigns MAX3 at block 770 and confirms that the secondary lower Target 3 has been reached at block 764. If the conditions are not met, the MERDIR3L direction flag is compared to −1 at block 772. If no, MERDIR3SL is set to 1 and system 106 proceeds back to Calculate MER block 306. If yes, TARGET3REACHEDSL is set to 1 at block 764. If TARGET3REACHEDSL has been set to 1, the system checks at decision blocks 750 and 752 whether Target 3 has been reached for the primary sideband and the secondary upper sideband as well. If confirmed, TARGET3REACHED is set to 1 at block 754. The process then transitions to MER calculation step 306.

Figure 8A:
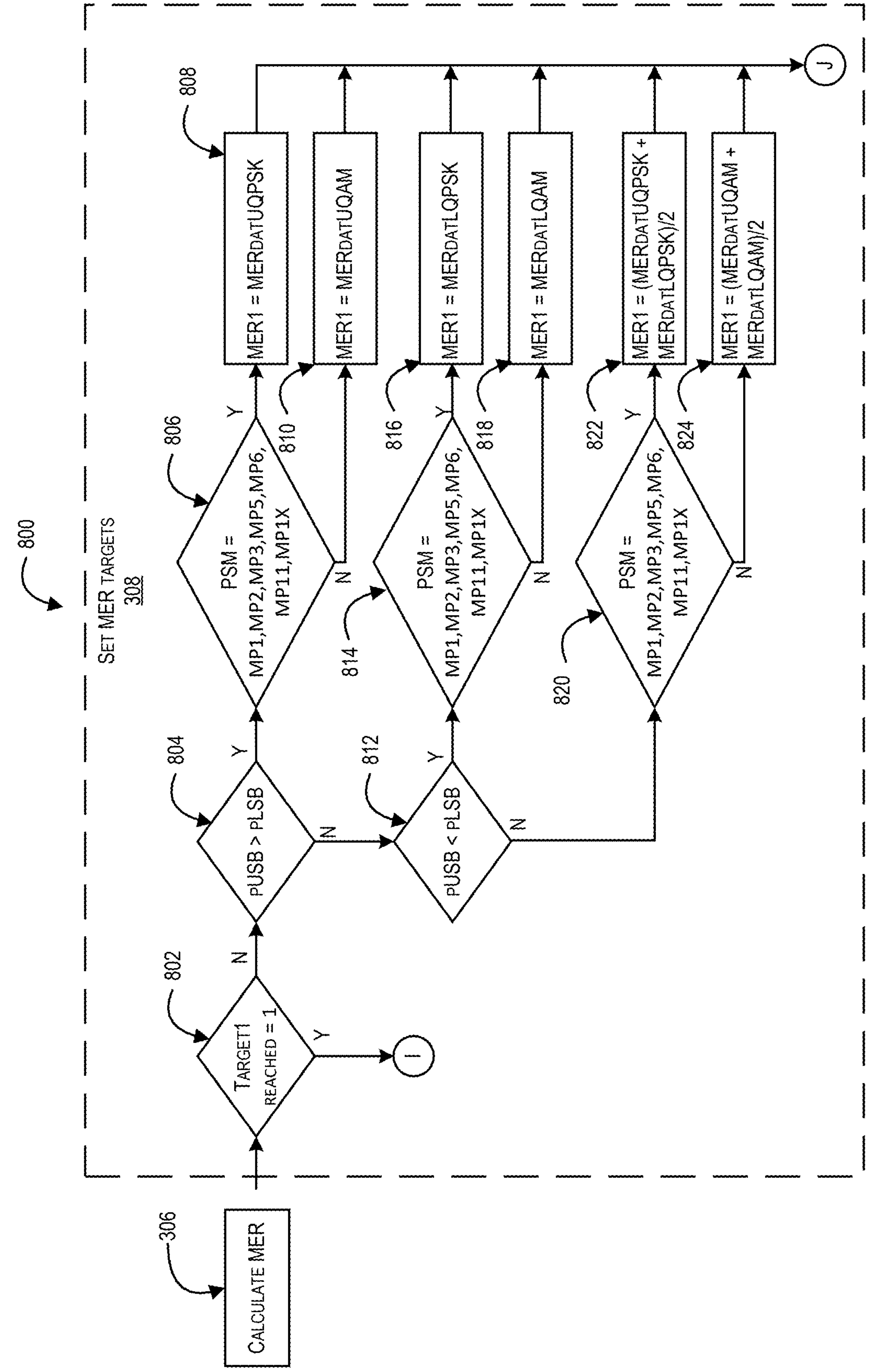
FIGS. 8A-8B is a flow chart of an operation of setting MER targets, in accordance with an embodiment of the present disclosure.
Figure 8B:
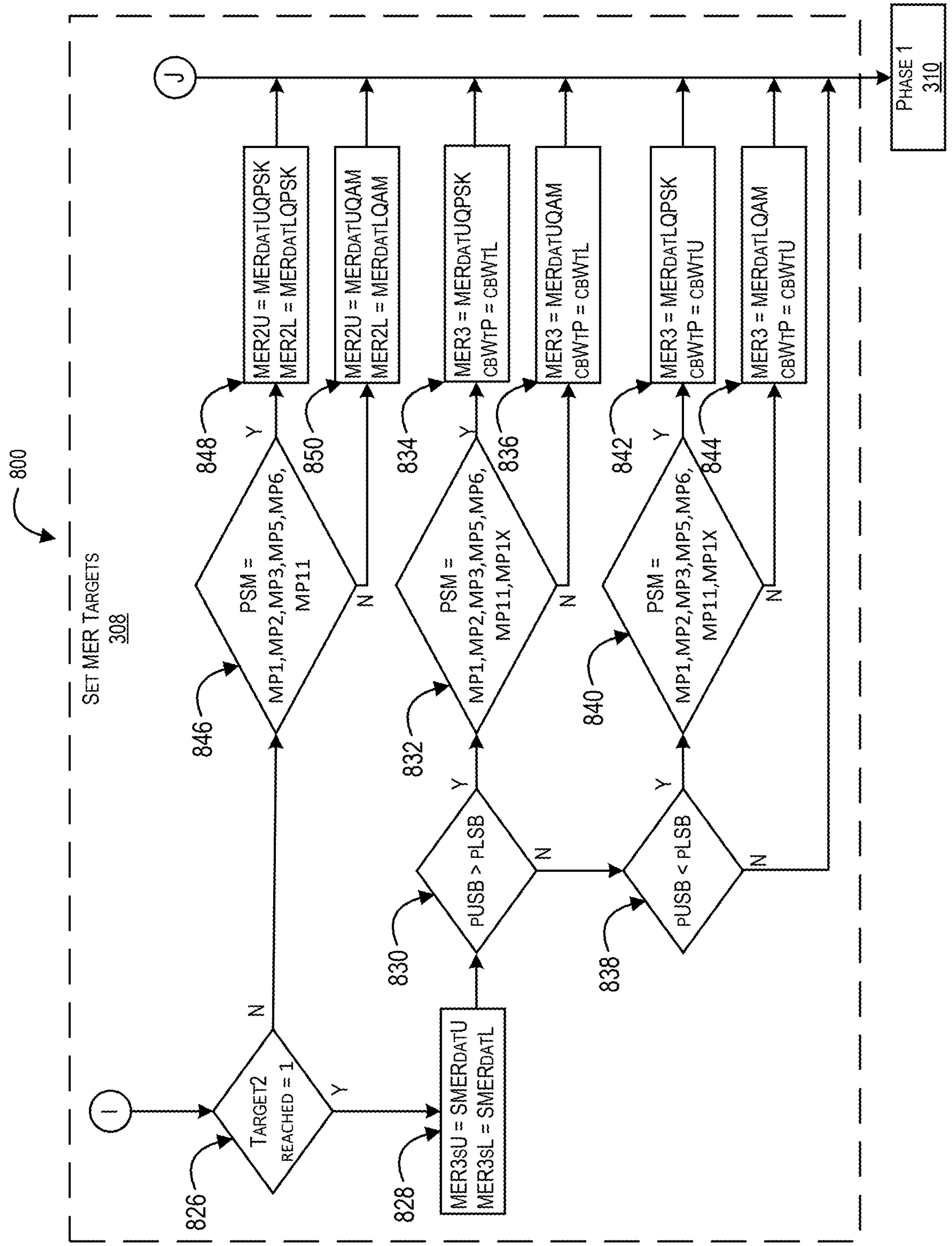

FIGS. 8A-8B is a flow chart 800 of an operation of setting MER targets, in accordance with an embodiment of the present disclosure. In an embodiment, MER target setting is a critical step in the PAPR optimization process, as it determines the reference values that guide iterative adjustments throughout the optimization servomechanism. The system 106 considers sideband power levels, primary service mode (PSM), and modulation schemes to define the appropriate MER target values for the transmission process.

In an embodiment, the process begins at block 802 by checking if target 1 reaches 1. If no, then the process evaluates whether the upper-sideband power (PUSB) is greater than the lower-sideband power (PLSB) at decision block 804. If this condition is met, the process proceeds to decision block 806, where it verifies the Primary Service Mode (PSM) classification. If the PSM is categorized as MP1, MP2, MP3, MP5, MP6, MP11, or MP1X, the system 106 assigns MER1 to MER values corresponding to Upper Sideband Quadrature Phase Shift Keying (UQPSK) modulation, as shown by block 808. Otherwise, the system 106 assigns MER1 to MER values corresponding to Upper Sideband QAM (UQAM) modulation as shown in block 810. If PUSB is not less than PLSB, the system 106 proceeds to decision block 812, where it checks whether PUSB is less than PLSB. If so, it applies a similar evaluation process, as shown by block 814, for Lower sideband Quadrature Phase Shift Keying (LQPSK) and Lower sideband Quadrature Amplitude Modulation (QAM) at blocks 816 and 818.

If neither condition is satisfied, the system 106 applies a similar evaluation process, as shown by block 820, and calculates MER1 as an average of the QPSK and QAM values, as shown by blocks 822 and 824, ensuring a balanced MER distribution for both sidebands. This guarantees that the transmission maintains consistent MER values across different modulation schemes before proceeding to the next stage. In an embodiment, at decision block 826, the system 106 evaluates whether Target 2 has been reached (TARGET2REACHED=1). If the target has been satisfied, the system 106 proceeds to block 828 to set phase 3 targets. If not, the system 106 proceeds to the next steps of the phase 2 target setting process, as shown by blocks 846, 848, and 850. At block 828, the system 106 assigns MER targets for the secondary upper sideband (MER3SU) and the secondary lower sideband (MER3SL) based on previously determined values from the initial MER calculations (SMERDATU and SMERDATL, respectively). The system 106 then compares the primary upper and lower sideband power levels at decision blocks 830 and 838. If PUSB is higher than PLSB, the system 106 sets the phase 3 MER target (MER3) to that of the upper secondary sideband based on modulation scheme (MERDATUQPSK or MERDATUQAM) and sets the primary sideband convergence bias target (CBWTP) to that of the lower primary sideband (CBWTL), as shown by blocks 832, 834, and 836. If PUSB is lower than PLSB, the system 106 sets MER3 to that of the lower secondary sideband based on modulation scheme (MERDATLQPSK or MERDATLQAM) and sets the primary sideband convergence bias target to that of the upper primary sideband (CBWTU), as shown by blocks 840, 842, and 844. The assigned MER targets are then propagated to the next optimization phase (i.e., Phase 1 at block 310), ensuring that the system 106 dynamically refines PAPR reduction parameters based on these reference values.

Figure 9:
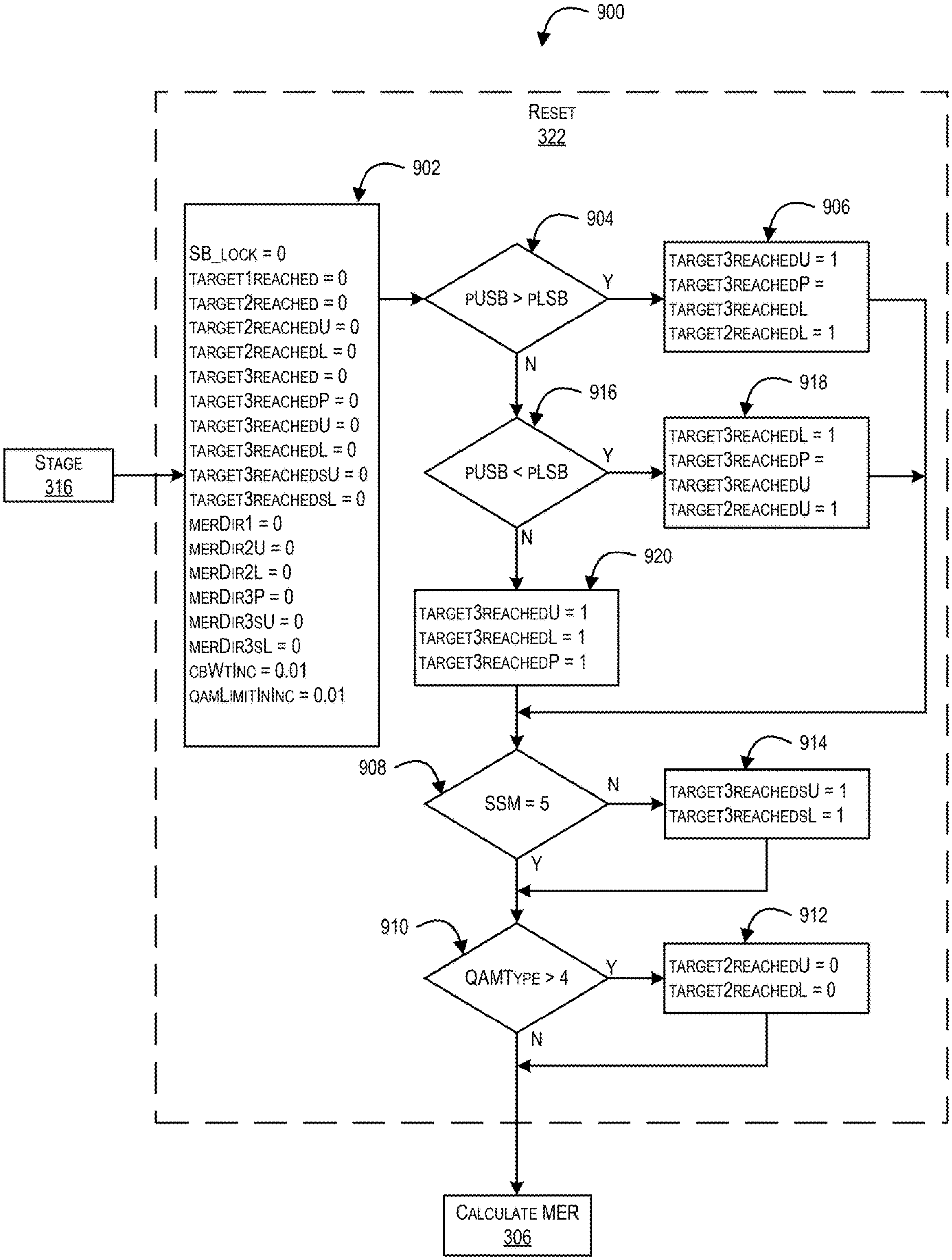
FIG. 9 is a flow chart of an operation of resetting in the optimization servomechanism, in accordance with an embodiment of the present disclosure.

FIG. 9 is a flow chart 900 of an operation of resetting in the optimization servomechanism, in accordance with an embodiment of the present disclosure. In an embodiment, the reset operation ensures that the PAPR optimization system 106 can reinitialize critical parameters and restore specific values to a predefined baseline, allowing for controlled adaptation in subsequent optimization cycles. The reset process prepares the system 106 for recalculating MER values, ensuring that iterative adjustments proceed efficiently.

At block 902, the reset process begins by initializing key system variables. This includes setting values such as SB_LOCK=0, TARGETIREACHED=0, TARGET2REACHED=0, TARGET3REACHED=0, and corresponding MER direction indicators (MERDIR1, MERDIR2U, MERDIR2L, MERDIR3P, MERDIR3SU, MERDIR3SL) to zero. Additionally, convergence bias weight parameters (CBWTINC) and QAM limit increments (QAMLIMITINC) are initialized to predefined values. This step ensures that the system has a clean state before continuing the next stage of PAPR optimization. Next, at decision block 904, the system 106 evaluates whether the primary-upper-sideband power (PUSB) is greater than the primary-lower-sideband power (PLSB). If this condition is met, the system 106 assigns, at block 906, Target 3 Upper as reached (TARGET3REACHEDU=1) and Target 2 Lower as reached (TARGET2REACHEDL=1), indicating that the current PAPR settings have achieved optimal MER values. At block 906 system 106 also sets Target 3 Primary Reached to Target 3 Lower Reached (TARGET3REACHEDP=TARGET3REACHEDL).

If PUSB is not greater than PLSB, the system 106 moves to decision block 916, where it checks if PUSB is less than PLSB. If this condition holds, the system 106 assigns Target 3 Lower as reached, Target 2 Upper as reached, and sets Target 3 Primary reached to Target 3 Upper Reached, at block 918. If neither condition is satisfied, the system assigns Target 3 as reached across all primary sidebands at block 920, ensuring that primary sideband convergence bias weight adjustments are finalized before recalculating MER values. The system 106 then proceeds to decision block 908, where it checks whether the Secondary Service Mode (SSM) is set to 5. If the condition is false, the system marks Target 3 as reached for both upper and lower secondary sidebands at block 914, finalizing the Target 3 initializations. Otherwise, the system 106 moves to decision block 910, where it evaluates whether QAMTYPE is greater than 4. If the condition is true, the system 106 resets Target 2 Reached values for the upper and lower sidebands at block 912, ensuring that the MER recalibration accounts for additional adjustments required in the next iteration. Once all conditions have been evaluated, the system 106 transitions to MER calculation at block 306, where the measurement module 206 determines the new MER values before resuming the next cycle of PAPR optimization.

Figure 10:
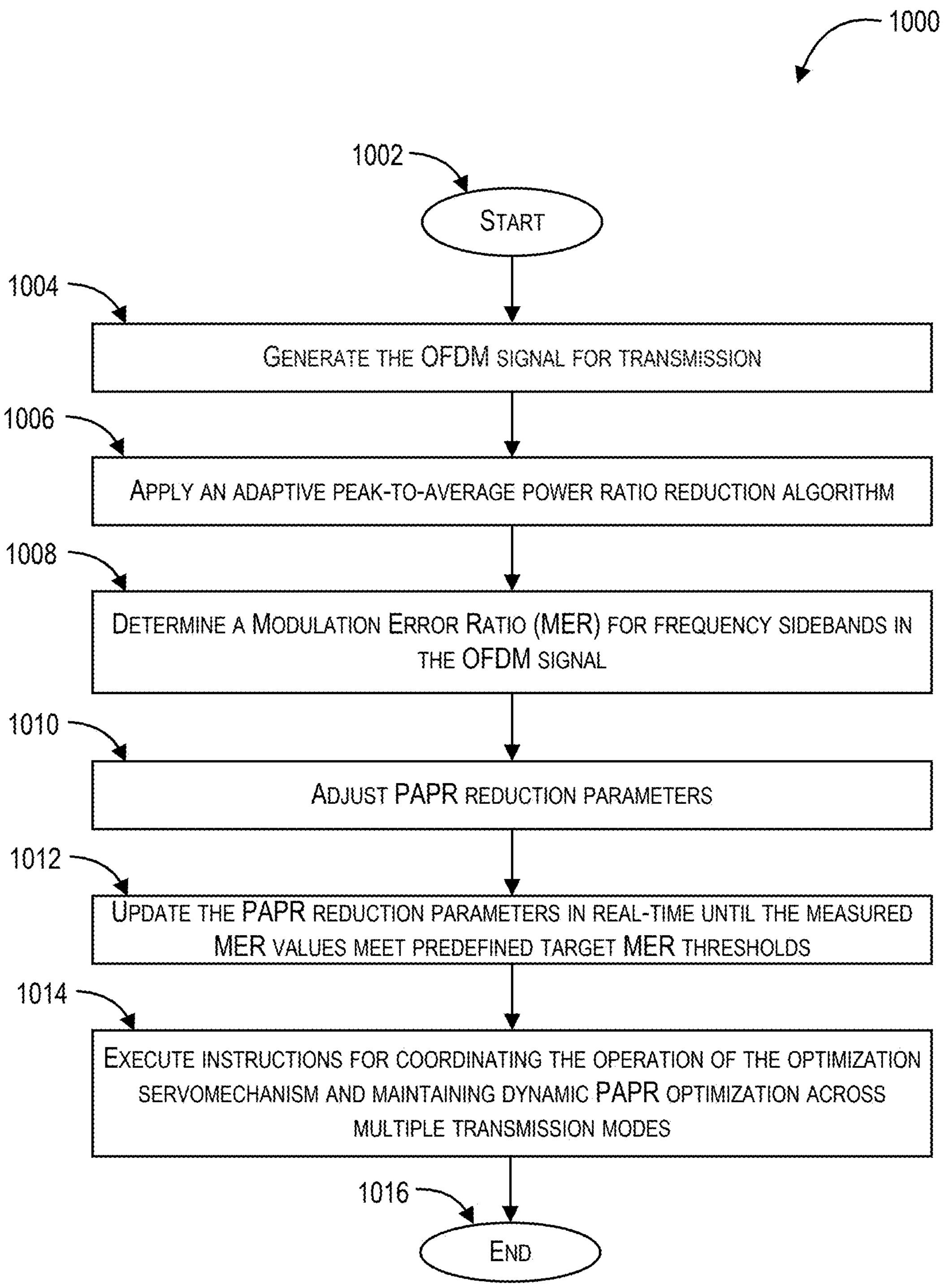
FIG. 10 is a flow chart of a PAPR optimization method for digital FM radio transmission, in accordance with an embodiment of the present disclosure.

FIG. 10 is a flow chart 1000 of a PAPR optimization method for digital FM radio transmission, in accordance with an embodiment of the present disclosure. The method starts at step 1002.

At first, at step 1004, the method may include the steps of generating the OFDM signal for transmission to facilitate digital FM broadcasting. Next, at step 1006 the method may include the steps of applying an adaptive peak-to-average power ratio reduction algorithm to the generated OFDM signal, ensuring the signal is optimized before transmission.

Next, at step 1008, the method may further include the steps of determining a Modulation Error Ratio (MER) for one or more frequency sidebands in the OFDM signal, providing a metric for assessing the effectiveness of PAPR reduction.

Next, at step 1010, the method may further include the steps of adjusting, iteratively, one or more PAPR reduction parameters based on the measured MER values. The adjustment may include the steps of optimizing the number of PAPR reduction iterations for a primary digital sideband, ensuring controlled signal peaks. Further, the method may include the steps of optimizing QAM constellation constraint limits for modulated signals within the OFDM signal, enhancing the integrity of the transmitted data. Additionally, the method may include the steps of adjusting convergence bias weight settings for the lowest-power primary digital sideband and/or secondary digital sidebands to maintain target MER values, ensuring that lower-power sidebands are efficiently managed. Next, at step 1012, the method may include the steps of updating the PAPR reduction parameters in real-time until the measured MER values meet predefined target MER thresholds. Thereafter, at step 1014, the method may include the steps of executing instructions for coordinating the operation of the optimization servomechanism and maintaining dynamic PAPR optimization across multiple transmission modes.

In an embodiment, the method may further include the steps of incrementally adjusting the number of PAPR iterations by a predefined step value until the primary digital sideband reaches a target MER threshold. Additionally, the method may include the steps of dynamically adjusting iteration values based on hardware processing constraints to optimize power efficiency. Further, the method may include the steps of optimizing modulation parameters for signals using 16-QAM and 64-QAM modulation schemes to minimize distortion. The method may further include the steps of incrementally adjusting the distance from a QAM constellation point to its nearest boundary to improve signal integrity, preventing errors in high-order modulation schemes.

In an embodiment, the method may further include the steps of prioritizing lower-power secondary digital sidebands and maintaining signal stability by dynamically adjusting bias weight settings. The method may further include the steps of performing bias weight adjustments using multi-stage incremental optimization, wherein each stage utilizes finer adjustment steps to improve accuracy, allowing for more refined control over the signal's power distribution. Further, the method may include the steps of continuously monitoring and comparing measured MER values against target thresholds and adjusting the PAPR parameters in real-time to ensure signal optimization. The method may further include the steps of stopping iterative adjustments when the measured MER values exceed the predefined target threshold, ensuring efficient convergence of the optimization process.

In an embodiment, the method may further include the steps of executing a multi-phase adaptive optimization algorithm, wherein in a first phase, optimizing the highest-power primary digital sideband; in a second phase, optimizing MER for QAM-modulated signals; and in a third phase, fine-tuning bias weight adjustments for secondary digital sidebands. The method may further include the steps of repeating the multi-phase optimization algorithm in multiple stages, with each subsequent stage using smaller parameter increment values to refine optimization, ensuring gradual fine-tuning of the signal parameters. Further, the method may include the steps of adjusting parameters based on real-time transmission conditions, enabling adaptive tuning across different FM digital broadcast modes, ensuring that the system remains responsive to varying channel conditions and maintains optimal transmission performance. The method ends at step 1016.

Figure 11:
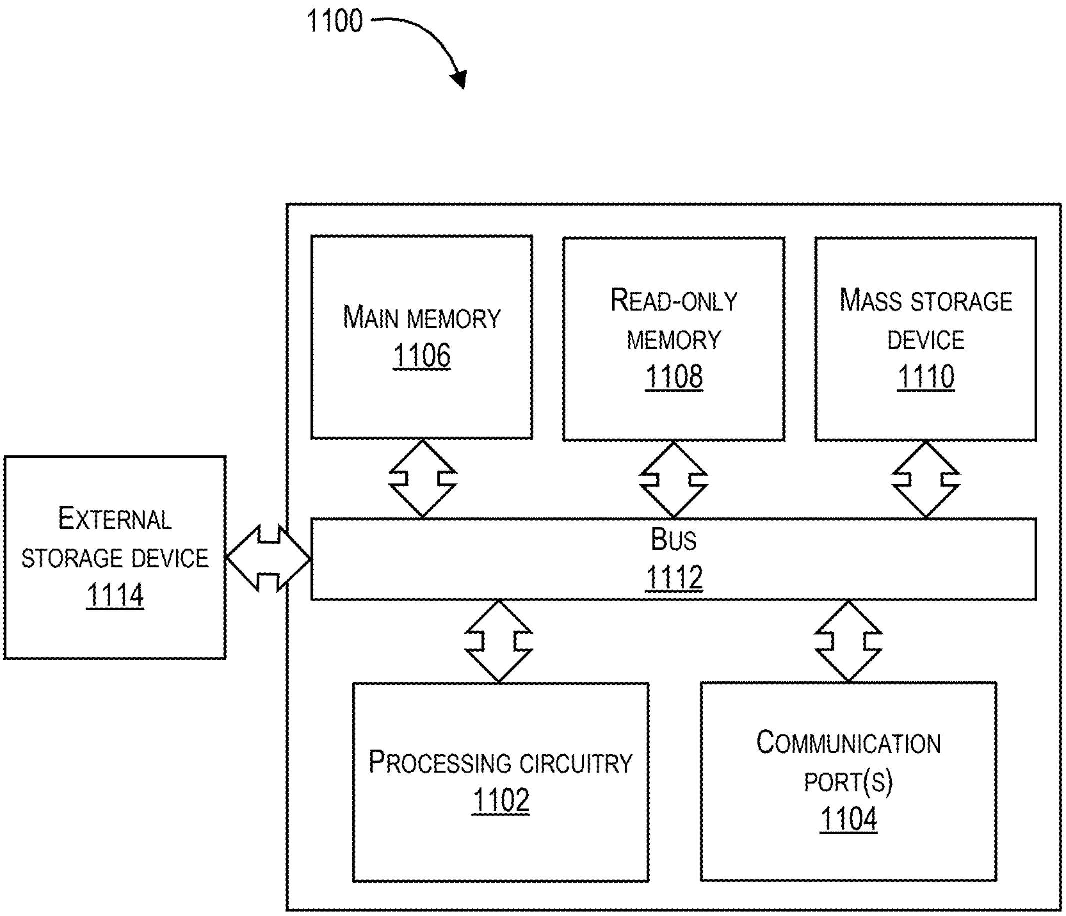
FIG. 11 illustrates an exemplary computer unit in which or with which embodiments of the present disclosure may be utilized.

FIG. 11 illustrates an exemplary computer unit 1100 in which or with which embodiments of the present disclosure may be utilized. As shown in FIG. 11, a computer system 1100 includes an external storage device 1114, a bus 1112, a main memory 1106, a read-only memory 1108, a mass storage device 1110, a communication port 1104, and a processor 1102.

Those skilled in the art will appreciate that computer system 1100 may include more than one processor 1102 and communication ports 1104. Examples of processor 1102 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 1102 may include various modules associated with embodiments of the present disclosure.

The communication port 1104 can be any of an RS-232 port for use with a modem-based dialup connection, a 10/100 Ethernet port, a Gigabit or 10 Gigabit port using copper or fiber, a serial port, a parallel port, or other existing or future ports. The communication port 1104 may be chosen depending on a network, such as a Local Area Network (LAN), Wide Area Network (WAN), or any network to which the computer system connects.

The memory 1106 can be Random Access Memory (RAM), or any other dynamic storage device commonly known in the art. Read-Only Memory 1108 can be any static storage device(s) e.g., but not limited to, a Programmable Read-Only Memory (PROM) chips for storing static information e.g., start-up or BIOS instructions for processor 1102.

The mass storage 1110 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 1112 communicatively couples processor(s) 1102 with the other memory, storage, and communication blocks. The bus 1112 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1102 to a software system.

Optionally, operator and administrative interfaces, e.g., a display, keyboard, and a cursor control device, may also be coupled to bus 1112 to support direct operator interaction with the computer system. Other operator and administrative interfaces can be provided through network connections connected through communication port 1104. An external storage device 1114 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD- ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously. Within the context of this document terms “coupled to” and “coupled with” are also used euphemistically to mean “communicatively coupled with” over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art

What is claimed is:

1. A Peak-to-Average Power Ratio (PAPR) optimization system for digital Frequency Modulation (FM) radio transmission, the PAPR optimization system comprising:

an Orthogonal Frequency-Division Multiplexed (OFDM) modulator configured to generate an OFDM signal for transmission;

a PAPR reduction module configured to apply an adaptive peak-to-average power ratio reduction algorithm to the OFDM signal;

a measurement module configured to determine a Modulation Error Ratio (MER) for one or more frequency sidebands in the OFDM signal;

an optimization servomechanism configured to iteratively adjust one or more PAPR reduction parameters based on measured MER values, wherein the optimization servomechanism further includes:

a Peak-to-Average Reduction (PAR) iteration controller configured to adjust a number of PAPR reduction iterations for a primary digital sideband;

a Quadrature Amplitude Modulation (QAM) constraint controller configured to refine QAM constellation constraint limits for modulated signals within the OFDM signal;

a convergence bias controller configured to adjust bias weight settings for at least one of: lowest-power primary digital sideband and secondary digital sidebands to maintain target MER values;

a feedback loop module configured to update the PAPR reduction parameters in real-time until the measured MER values meet predefined target MER thresholds; and a control processor configured to execute instructions for coordinating the operation of the optimization servomechanism and maintaining dynamic PAPR optimization across multiple transmission modes.

2. The PAPR optimization system of claim 1, wherein the PAR iteration controller is configured to incrementally adjust the number of PAPR reduction iterations by a predefined step value until a highest-power primary digital sideband reaches a target MER threshold.

3. The PAPR optimization system of claim 2, wherein the PAR iteration controller dynamically adjusts iteration values based on hardware processing constraints to optimize power efficiency.

4. The PAPR optimization system of claim 1, wherein the QAM constraint controller is configured to optimize modulation parameters for signals using 16-QAM and 64-QAM modulation schemes to minimize distortion.

5. The PAPR optimization system of claim 4, wherein the QAM constraint controller incrementally adjusts a distance from a QAM constellation point to its nearest boundary to improve signal integrity.

6. The PAPR optimization system of claim 1, wherein the convergence bias controller is configured to prioritize at least one of: lowest-power primary digital sideband and secondary digital sidebands and maintain signal stability by dynamically adjusting convergence bias weight settings.

7. The PAPR optimization system of claim 6, wherein adjustment of the convergence bias weight settings is performed using multi-stage incremental optimization, wherein each stage utilizes finer adjustment steps to improve accuracy.

8. The PAPR optimization system of claim 1, wherein the feedback loop module is configured to continuously monitor and compare the measured MER values against target thresholds and adjust the PAPR reduction parameters in real-time.

9. The PAPR optimization system of claim 8, wherein the feedback loop module stops iterative adjustments when the measured MER values exceed the predefined target MER thresholds, ensuring efficient convergence.

10. The PAPR optimization system of claim 1, wherein the control processor is configured to execute a multi-phase adaptive optimization algorithm, wherein:

in a first phase, the PAR iteration controller optimizes a highest-power primary digital sideband;

in a second phase, the QAM constraint controller optimizes MER for QAM-modulated signals; and in a third phase, the convergence bias controller fine-tunes convergence bias weight adjustments for at least one of: lowest-power primary digital sideband and secondary digital sidebands.

11. The PAPR optimization system of claim 10, wherein the multi-phase optimization algorithm is configured to repeat in multiple stages, with each subsequent stage using smaller parameter increment values to refine optimization.

12. The PAPR optimization system of claim 1, wherein the control processor adjusts system parameters based on real-time transmission conditions, enabling adaptive tuning across different FM digital broadcast modes.

13. A Peak-to-Average Power Ratio (PAPR) optimization method for digital FM radio transmission, the PAPR optimization method comprising:

generating an Orthogonal Frequency-Division Multiplexed (OFDM) signal for transmission;

applying an adaptive peak-to-average power ratio reduction algorithm to the OFDM signal;

determining a Modulation Error Ratio (MER) for one or more frequency sidebands in the OFDM signal;

adjusting, iteratively, one or more PAPR reduction parameters based on the measured MER values, wherein the adjusting further includes the steps of:

adjusting a number of PAPR reduction iterations for a primary digital sideband;

refining Quadrature Amplitude Modulation (QAM) constellation constraint limits for modulated signals within the OFDM signal;

adjusting bias weight settings for at least one of: lowest-power primary digital sideband and secondary digital sidebands to maintain target MER values;

updating the PAPR parameters in real-time until the measured MER values meet predefined target MER thresholds; and executing instructions for coordinating the operation of the optimization servomechanism and maintaining dynamic PAPR optimization across multiple transmission modes.

14. The PAPR optimization method of claim 13, further comprising:

incrementally adjusting the number of PAPR reduction iterations by a predefined step value until a highest-power primary digital sideband reaches a target MER threshold; and dynamically adjusting iteration values based on hardware processing constraints to optimize power efficiency.

15. The PAPR optimization method of claim 13, further comprising:

optimizing modulation parameters for signals using 16-QAM and 64-QAM modulation schemes to minimize distortion; and incrementally adjusting a distance from a QAM constellation point to its nearest boundary to improve signal integrity.

16. The PAPR optimization method of claim 13, further comprising prioritizing at least one of: lowest-power primary digital sideband and secondary digital sidebands and maintaining signal stability by dynamically adjusting convergence bias weight settings, wherein adjustment of the convergence bias weight settings is performed using multi-stage incremental optimization, wherein each stage utilizes finer adjustment steps to improve accuracy.

17. The PAPR optimization method of claim 13, further comprising:

continuously monitoring and comparing the measured MER values against target thresholds to adjust the PAPR reduction parameters in real-time; and stopping iterative adjustments when the measured MER values exceed the predefined target MER thresholds, ensuring efficient convergence.

18. The PAPR optimization method of claim 13, further comprising executing a multi-phase adaptive optimization algorithm, wherein:

in a first phase, optimizing a highest-power primary digital sideband;

in a second phase, optimizing MER for QAM-modulated signals; and in a third phase, fine-tuning convergence bias weight adjustments for at least one of: lowest-power primary digital sideband and/or secondary digital sidebands.

19. The PAPR optimization method of claim 18, wherein the multi-phase optimization algorithm is configured to repeat in multiple stages, with each subsequent stage using smaller parameter increment values to refine optimization.

20. The PAPR optimization method of claim 13, further comprising adjusting parameters based on real-time transmission conditions, enabling adaptive tuning across different FM digital broadcast modes.

* * * * *